(12) United States Patent
Zhang et al.

(10) Patent No.: US 11,979,879 B2
(45) Date of Patent: May 7, 2024

(54) INFORMATION TRANSMISSION METHOD, COMMUNICATIONS DEVICE, AND NETWORK DEVICE

(71) Applicant: HUAWEI TECHNOLOGIES CO., LTD., Guangdong (CN)

(72) Inventors: Jinfang Zhang, Shenzhen (CN); Hongjia Su, Shanghai (CN); Lei Lu, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 502 days.

(21) Appl. No.: 17/189,979

(22) Filed: Mar. 2, 2021

(65) Prior Publication Data

US 2021/0185711 A1    Jun. 17, 2021

Related U.S. Application Data

(63) Continuation of application No. PCT/CN2019/102508, filed on Aug. 26, 2019.

(30) Foreign Application Priority Data

Sep. 4, 2018 (CN) .......................... 201811024885.3

(51) Int. Cl.
*H04W 72/20* (2023.01)
*H04W 72/30* (2023.01)

(52) U.S. Cl.
CPC .......... *H04W 72/20* (2023.01); *H04W 72/30* (2023.01)

(58) Field of Classification Search
CPC .... H04W 72/20; H04W 72/30; H04W 72/121
See application file for complete search history.

(56) References Cited

U.S. PATENT DOCUMENTS

2012/0157142 A1\* 6/2012 Yajima ................. H04W 72/12
                                                                    455/509
2013/0322413 A1   12/2013 Pelletier et al.
(Continued)

FOREIGN PATENT DOCUMENTS

CN          104335654 A      2/2015
CN          105338637 A      2/2016
(Continued)

OTHER PUBLICATIONS

3GPP TR 22.886 V16.0.0:"3rd Generation Partnership Project; Technical Specification Group Services and System Aspects; Study on enhancement of 3GPP Support for 5G V2X Services(Release 16)",Jun. 2018,total 67 pages.
(Continued)

*Primary Examiner* — Harry H Kim
(74) *Attorney, Agent, or Firm* — WOMBLE BOND DICKINSON (US) LLP

(57) ABSTRACT

Embodiments of this application provide an information transmission method, a communications device, and a network device. The information transmission method may include: sending, by a first communications device, a request message to a network device, to request the network device to schedule a resource for transmission of sidelink information between the first communications device and a second communications device; and further receiving indication information that is used to indicate the resource and that is sent by the network device, and sending the sidelink information to the second communications device on the resource. In the embodiments of this application, reachability of the sidelink information can be ensured.

16 Claims, 10 Drawing Sheets

(56) References Cited

U.S. PATENT DOCUMENTS

| | | | |
|---|---|---|---|
| 2015/0215107 A1 | 7/2015 | Siomina et al. | |
| 2016/0192326 A1 | 6/2016 | Park et al. | |
| 2018/0054755 A1 | 2/2018 | Lee et al. | |
| 2018/0324842 A1* | 11/2018 | Gulati | H04W 72/1263 |
| 2019/0069247 A1* | 2/2019 | Wu | H04W 76/15 |
| 2019/0274121 A1* | 9/2019 | Wu | H04L 5/0092 |
| 2020/0022089 A1* | 1/2020 | Guo | H04W 24/08 |
| 2020/0137539 A1* | 4/2020 | Brahmi | H04W 74/0816 |
| 2021/0314974 A1* | 10/2021 | Miao | H04W 72/046 |
| 2021/0400713 A1* | 12/2021 | He | H04W 72/21 |

FOREIGN PATENT DOCUMENTS

| | | |
|---|---|---|
| CN | 107079530 A | 8/2017 |
| CN | 108347313 A | 7/2018 |
| EP | 3282794 A1 | 2/2018 |
| EP | 3499991 A1 | 6/2019 |
| WO | 2018028586 A1 | 2/2018 |
| WO | 2018126872 A1 | 7/2018 |

OTHER PUBLICATIONS

3GPP TS 36.212 V13.8.0:"3rd Generation Partnership Project; Technical Specification Group Radio Access Network; Evolved Universal Terrestrial Radio Access (E-UTRA); Multiplexing and channel coding(Release 13)," Jun. 2018,total 140 pages.

3GPP TS 36.321 V14.7.0:"3rd Generation Partnership Project; Technical Specification Group Radio Access Network; Evolved Universal Terrestrial Radio Access (E-UTRA);Medium Access Control (MAC) protocol specification(Release 14)",Jul. 2018,total 109 pages.

3GPP TS 38.321 V15.2.0:"3rd Generation Partnership Project; Technical Specification Group Radio Access Network; NR;Medium Access Control (MAC) protocol specification(Release 15)," ,Jun. 2018, total 73 pages.

Spreadtrum Communications, An Enhanced Scheduling Request Method for V2X. 3GPP TSG RAN WG1 meeting #84 bis, Busan, Korea, Apr. 11-15, 2016, R1-162544, 2 pages.

Qualcomm Incorporated, Enhancements of LTE Uu and NR Uu to control NR sidelink. 3GPP TSG-RAN WG1 Meeting #94, Gothenburg, Sweden, Aug. 20-24, 2018, R1-1809451, 4 pages.

Qualcomm Incorporated, Signaling for ProSe Direct Communication. 3GPP TSG-RAN WG2 #87 , Aug. 18, Aug. 22, 2014, R2-143671, 4 pages.

CATT, On mode 1 resource allocation for broadcast communication. 3GPP TSG RAN WG1 Meeting #77, Seoul, Korea, May 19 23, 2014, R1-142004, 5 pages.

Rapporteur (Ericsson), [85bis#19][LTE/D2D] Resource allocation details for D2D Communication. 3GPP TSG-RAN WG2 #86, Seoul, Republic of Korea, May 19 23, 2014, R2-142429, 20 pages.

* cited by examiner

| Destination index 1 | LCG identifier 1 | Buffer size 1 | Byte 1 |
| Buffer size 1 | Semi-persistent scheduling configuration index 1 | | Byte 2 |
| Destination index 2 | LCG identifier 2 | Buffer size 2 | Byte 3 |
| Buffer size 2 | Semi-persistent scheduling configuration index 2 | | Byte 4 |
| ... | | | Byte 5 |

FIG. 9

INFORMATION TRANSMISSION METHOD, COMMUNICATIONS DEVICE, AND NETWORK DEVICE

CROSS-REFERENCE TO RELATED APPLICATIONS

This application is a continuation of International Application No. PCT/CN2019/102508, filed on Aug. 26, 2019, which claims priority to claims priority to Chinese Patent Application No. 201811024885.3, filed on Sep. 4, 2018, The disclosures of the aforementioned applications are hereby incorporated by reference in their entireties.

TECHNICAL FIELD

This application relates to the field of communications technologies, and in particular, to an information transmission method, a communications device, and a network device.

BACKGROUND

A vehicle-to-everything (V2X) communications system may provide intelligent transportation services including a vehicle-to-vehicle (V2V) intelligent transportation service, a vehicle-to-pedestrian (V2P) intelligent transportation service, a vehicle-to-infrastructure (V2I) intelligent transportation service, a vehicle-to-network (V2N) intelligent transportation service, and the like. Information transmission between V2Ns uses an uplink and a downlink, and apart from this, information transmission between V2Vs, V2Is, or V2Ps may be performed on a sidelink, if information does not need to be forwarded by a network device, except that.

Currently, transmission between communications devices on a sidelink is usually in half-duplex mode, that is, a communications device cannot perform receiving and sending at the same time. When a communications device is sending information, due to half-duplex, the communications device cannot receive information sent by another device.

To ensure that information transmitted between the communications devices on the sidelink can accurately reach a destination communications device, an information unreachable problem caused due to half-duplex needs to be resolved.

SUMMARY

Embodiments of this application provide an information transmission method, a communications device, and a network device, to resolve an information unreachable problem caused due to half-duplex.

According to a first aspect, an embodiment of this application provides an information transmission method, including:

a first communications device sends a first request message to a network device on a first resource, where the first request message is used to request the network device to schedule a resource for transmission of sidelink information between the first communications device and a second communications device, the first communications device and the second communications device belong to one multicast group, and the first resource is a resource that is corresponding to the multicast group and that is used for sending a request message;

the first communications device receives first indication information sent by the network device, where the first indication information is used to indicate a second resource scheduled by the network device for transmission of the sidelink information between the first communications device and the second communications device; and the first communications device sends the sidelink information to the second communications device on the second resource.

In this method, the first communications device may send the first request message to the network device, so that the network device schedules the resource for transmission of the sidelink information between the first communications device and the second communications device, thereby avoiding scheduling the second communications device to send the information. This can effectively ensure reachability of the sidelink information sent by the first communications device to the second communications device, and effectively resolve an information unreachable problem caused due to half-duplex on a sidelink.

In addition, in the information transmission method, because the first resource is the resource that is corresponding to the multicast group to which the first communications device and the second communications device belong and that is used for sending the request message, the information transmission method may be applicable to a multicast transmission scenario between communications devices. In a process in which the first communications device requests scheduling from the network device by using the first request message, the first communications device implicitly indicates the second communications device to the network device by using a resource on which the first request message is located, that is, the first resource. This can further reduce an amount of information carried in the first request message, reduce changes of the request message, and improve applicability of the method while ensuring the reachability of the sidelink information sent by the first communications device to the second communications device.

In an embodiment, the first resource is a preset resource; or before the first communications device sends a first request message to a network device on a first resource, the method further includes:

the first communications device receives second indication information sent by the network device, where the second indication information is used to indicate the first resource.

In an embodiment, the first request message is a scheduling request SR message.

In an embodiment, the first indication information includes identification information of the second communications device.

In an embodiment, the method further includes:

the first communications device receives scrambled downlink control information DCI sent by the network device;

the first communications device performs first-descrambling on the scrambled DCI based on identification information of the first communications device; and the first communications device performs second-descrambling on the first-descrambled information based on the identification information of the second communications device, to determine the identification information of the second communications device.

According to a second aspect, an embodiment of this application further provides an information transmission method, including:

- a network device receives a first request message sent by a first communications device, where the first request message is used to request a resource scheduled by the network device for transmission of sidelink information between the first communications device and a second communications device;
- the network device determines, based on a first resource on which the first request message is located and a correspondence between a preset resource and a multicast group, a multicast group corresponding to the first resource, where the first communications device and the second communications device belong to the multicast group;
- the network device schedules a second resource for transmission of the sidelink information between the first communications device and the second communications device; and
- the network device sends first indication information to the first communications device, where the first indication information is used to indicate the second resource.

In this method, the first communications device may send a third request message to the network device, so that the network device schedules the resource for transmission of the sidelink information between the first communications device and the second communications device, thereby avoiding scheduling the second communications device to send information. This can effectively ensure reachability of the sidelink information sent by the first communications device to the second communications device, and effectively resolve an information unreachable problem caused due to half-duplex on a sidelink.

In an embodiment, the first resource is the preset resource; or before the network device receives a first request message sent by a first communications device, the method further includes:
- the network device sends second indication information to the first communications device, where the second indication information is used to indicate the first resource.

In an embodiment, the first request message is a scheduling request SR message.

In an embodiment, the first indication information includes identification information of the second communications device.

In an embodiment, the method further includes:
- the network device performs first-scrambling on downlink control information DCI based on the identification information of the second communications device;
- the network device performs second-scrambling on the first-scrambled DCI based on identification information of the first communications device; and
- the network device sends the second-scrambled DCI to the first communications device.

According to a third aspect, an embodiment of this application further provides an information transmission method, including:
- a first communications device sends a second request message to a network device, where the second request message is used to request the network device to schedule a resource for transmission of sidelink information between the first communications device and a second communications device, and the second request message includes identification information of the second communications device;
- the first communications device receives third indication information sent by the network device, where the third indication information is used to indicate a third resource scheduled by the network device for transmission of the sidelink information between the first communications device and the second communications device; and
- the first communications device sends, on the third resource, the sidelink information to the second communications device.

In an embodiment, the second request message is a buffer status report BSR message.

In an embodiment, the identification information of the second communications device includes at least one of the following information:
- a logical channel group LCG identifier corresponding to a traffic flow of the first communications device, an LCG identifier corresponding to a traffic flow of a multicast group to which the first communications device belongs, a group identifier of a multicast group to which the second communications device belongs, an identifier of the second communications device, and a semi-persistent scheduling configuration index of the first communications device or a semi-persistent scheduling configuration index of a multicast group to which the first communications device belongs; and
- the traffic flow of the first communications device is a traffic flow transmitted for the second communications device, the first communications device and the second communications device belong to a same multicast group, and the semi-persistent scheduling configuration index of the first communications device is a semi-persistent scheduling configuration index transmitted for the second communications device.

In an embodiment, the third indication information includes the identification information of the second communications device.

In an embodiment, the method further includes:
- the first communications device receives scrambled downlink control information DCI sent by the network device;
- the first communications device performs first-descrambling on the scrambled DCI based on identification information of the first communications device; and
- the first communications device performs second-descrambling on the first-descrambled information based on the identification information of the second communications device, to obtain the identification information of the second communications device.

According to a fourth aspect, an embodiment of this application may further provide an information transmission method, including:
- a network device receives a second request message sent by a first communications device, where the second request message includes identification information of a second communications device;
- the network device schedules a third resource for transmission of sidelink information between the first communications device and the second communications device; and
- the network device sends third indication information to the first communications device, where the third indication information is used to indicate the third resource.

In an embodiment, the second request message is a buffer status report BSR message.

In an embodiment, the identification information of the second communications device includes at least one of the following information:

a logical channel group LCG identifier corresponding to a traffic flow of the first communications device, an LCG identifier corresponding to a traffic flow of a multicast group to which the first communications device belongs, a group identifier of a multicast group to which the second communications device belongs, an identifier of the second communications device, and a semi-persistent scheduling configuration index of the first communications device or a semi-persistent scheduling configuration index of a multicast group to which the first communications device belongs; and the traffic flow of the first communications device is a traffic flow transmitted for the second communications device, the first communications device and the second communications device are located in a same multicast group, and the semi-persistent scheduling configuration index of the first communications device is a semi-persistent scheduling configuration index transmitted for the second communications device.

In an embodiment, the third indication information includes the identification information of the second communications device.

In an embodiment, the method further includes:

the network device performs first-scrambling on downlink control information DCI based on the identification information of the second communications device;

the network device performs second-scrambling on the first-scrambled DCI based on identification information of the first communications device; and the network device sends the second-scrambled DCI to the first communications device.

According to a fifth aspect, an embodiment of this application may further provide an apparatus on a first communications device side, where the apparatus may be the first communications device side or a chip in the first communications device side.

The apparatus can implement any function of the first communications device in either of the first aspect and the third aspect. The function may be implemented by hardware, or may be implemented by hardware by executing corresponding software. The hardware or the software includes one or more units corresponding to the foregoing function.

In an embodiment, when the apparatus is the first communications device, the first communications device may include a processor and a transceiver, and the processor is configured to support the first communications device in performing a corresponding function in the foregoing methods. The transceiver is configured to support communication between the first communications device and a network device, and between the first communications device and a second communications device, and send information or an instruction in the foregoing methods to the network device or the second communications device. In an embodiment, the first communications device may further include a memory. The memory is configured to couple to the processor, and stores a program instruction and data that are necessary for the first communications device.

In an embodiment, the apparatus includes a processor, a baseband circuit, a radio frequency circuit, and an antenna. The processor is configured to control functions of various circuit components, and the baseband circuit is configured to generate various types of signaling and messages, for example, generate a downlink physical layer protocol data unit (PPDU). The radio frequency circuit performs processing, for example, analog conversion, filtering, amplification, and up-conversion, on the signaling and messages, and the processed signaling and messages are sent by the antenna to the network device or the second communications device. In an embodiment, the apparatus may further include a memory. The memory stores a program instruction and data that are necessary for the first communications device.

In an embodiment, when the apparatus is a chip in the first communications device, the chip includes a processing module and a transceiver module. The processing module may be, for example, a processor. For example, the processor is configured to generate various types of messages and signaling, encapsulate the various types of messages according to a protocol and then process the messages, for example, perform coding, modulation, and amplification. The processor can be further configured to perform demodulation, decoding, and decapsulation to obtain signaling and messages. The transceiver module may be, for example, an input/output interface, a pin, or a circuit on the chip. The processing module can execute a computer-executable instruction stored in a storage unit, to support the first communications device in performing a corresponding function in the foregoing methods. In an embodiment, the storage unit may be a storage unit inside the chip, for example, a register or a buffer. The storage unit may alternatively be a storage unit located outside the chip and in the first communications device, for example, a read-only memory (ROM), or a static storage device of another type that can store static information and an instruction, or a random access memory (RAM).

Any one of the foregoing processors may be a general-purpose central processing unit (CPU), a microprocessor, an application-specific integrated circuit (ASIC), or one or more integrated circuits configured to control program execution in the information transmission method according to the foregoing aspects.

According to a sixth aspect, an embodiment of this application provides an apparatus applied to a network device side, where the apparatus may be a network device or a chip in the network device.

The apparatus has any function of implementing the network device in either of the second aspect and the fourth aspect. The function may be implemented by hardware, or may be implemented by hardware by executing corresponding software. The hardware or the software includes one or more units corresponding to the foregoing function.

In an embodiment, the apparatus may be the network device. The network device includes a processor and a transceiver, and the processor is configured to support the network device in performing a corresponding function in the foregoing methods. The transceiver is configured to support communication between the network device and a first communications device, and receive information or an instruction that is in the foregoing methods and that is sent by the first communications device. In an embodiment, the network device may further include a memory. The memory is configured to couple to the processor, and stores a program instruction and data that are necessary for the network device.

In an embodiment, the apparatus includes a processor, a memory, a transceiver, an antenna, and an input/output apparatus. The processor is mainly configured to: control the entire apparatus, and execute a computer program instruction, to support the apparatus in performing the action and the like described in the method embodiment in either of the second aspect and the fourth aspect. The memory is mainly configured to store a program instruction and data that are necessary for the network device. The transceiver is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display screen, or a keyboard, is mainly configured to receive data input by a user and output data to the user.

In an embodiment, the apparatus may be a chip in the network device, and the chip includes a processing module and a transceiver module. The processing module may be, for example, a processor. For example, the processor is configured to generate various types of messages and signaling, and perform processing such as encoding, modulation, and amplification on the various types of messages after encapsulating the various types of messages according to a protocol. The processor may be further configured to perform demodulation, decoding, and decapsulation to obtain signaling and messages. The transceiver module may be, for example, an input/output interface, a pin, or a circuit on the chip. The processing module can execute a computer-executable instruction stored in a storage unit, to support the network device in performing a corresponding function in the foregoing methods. In an embodiment, the storage unit may be a storage unit in the chip, for example, a register or a buffer, or the storage unit may be a storage unit located in the network device but outside the chip, for example, a ROM, another type of static storage device that can store static information and an instruction, or a RAM.

The processor mentioned in any one of the foregoing designs may be a CPU, a microprocessor, an ASIC, or one or more integrated circuits used to control program execution of the information transmission method in the foregoing aspects.

According to a seventh aspect, an embodiment of this application provides a computer-readable storage medium, where the computer-readable storage medium stores an instruction, and the instruction can be executed by one or more processors on a processing circuit. When the instruction is run on a computer, the computer is enabled to perform the method in any embodiment in any one of the first aspect, the third aspect, the second aspect, or the fourth aspect.

According to an eighth aspect, an embodiment of this application provides a computer program product including an instruction, where when the computer program product runs on a computer, the computer is enabled to perform the method in any embodiment in any one of the first aspect, the third aspect, the second aspect, or the fourth aspect.

According to a ninth aspect, an embodiment of this application provides a wireless communications system, where the system includes at least one first communications device, a network device, and at least one second communications device used in the foregoing aspects.

Embodiments of this application provide the information transmission method, the communications device, and the network device. The first communications device may send the request message to the network device, so that the network device schedules the resource for transmission of the sidelink information between the first communications device and the second communications device, and returns an indication message to the first communications device, to indicate the resource scheduled by the network device; and the first communications device may send the sidelink information to the second communications device on the scheduled resource after receiving the indication message. In this method, the first communications device may send the request message to the network device, so that the network device schedules the resource for transmission of the sidelink information between the first communications device and the second communications device, thereby avoiding scheduling the second communications device to send the information. This can effectively ensure the reachability of the sidelink information sent by the first communications device to the second communications device, and effectively resolve the information unreachable problem caused due to half-duplex on the sidelink.

BRIEF DESCRIPTION OF DRAWINGS

FIG. 9 is a schematic structural diagram in which a BSR message carries identification information of a second communications device in an information transmission method according to an embodiment of this application;

DESCRIPTION OF EMBODIMENTS

Figure 1:
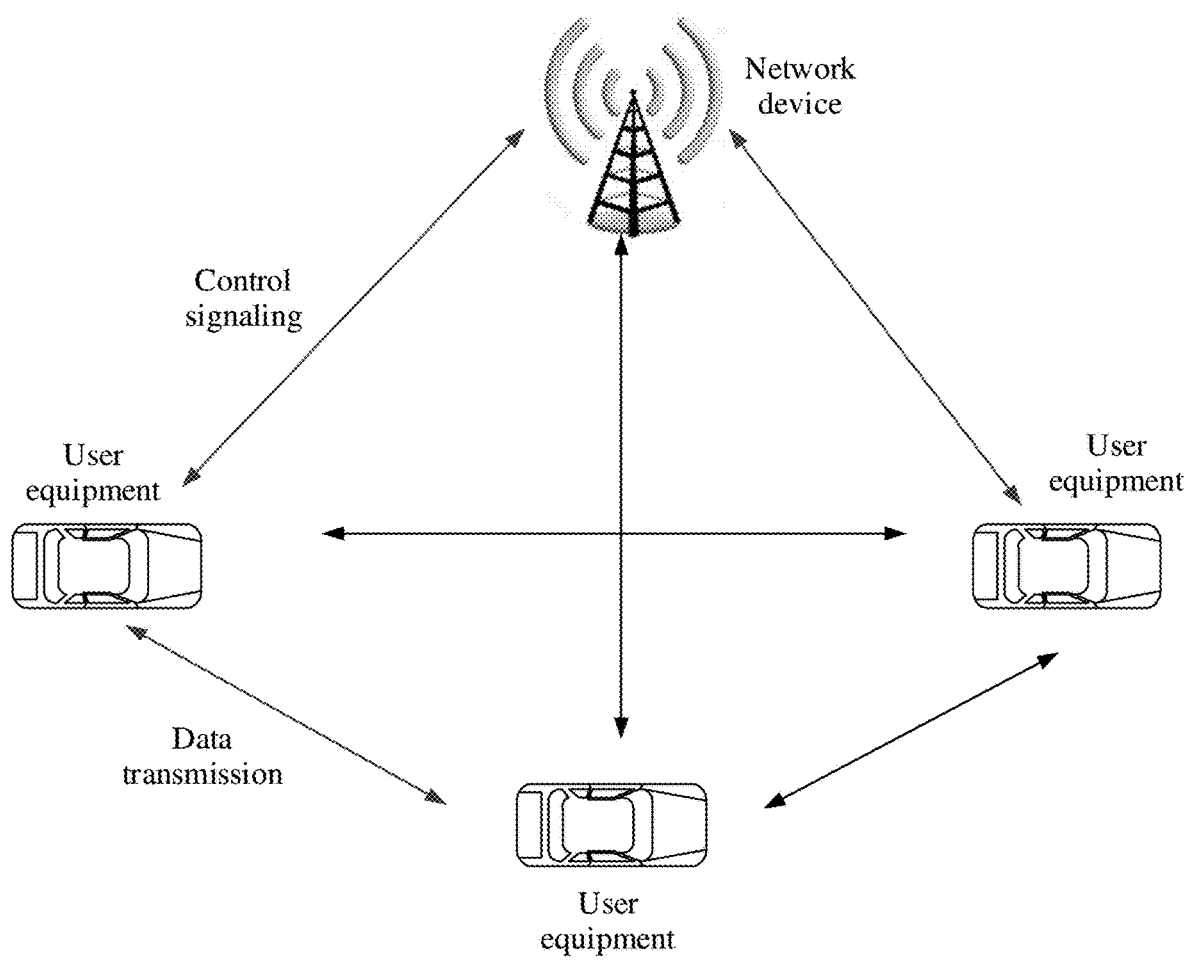
FIG. 1 is an architectural diagram of a V2V network system to which an information transmission method according to an embodiment of this application is applicable.

The information transmission method, the communications device, and the network device that are provided in the embodiments of this application may be applicable to device-to-device (D2D) communication based on 4G, 5G, wireless fidelity (WiFi), or another wireless communications network, and communication between communications devices in an internet of vehicles scenario, especially a scenario of mode 3 transmission between communications devices. The internet of vehicles scenario may be a scenario of an intelligent transportation service such as V2V, V2I, or V2P in a V2X communications system. FIG. 1 is an architectural diagram of a V2V network system to which an information transmission method according to an embodiment of this application is applicable. As shown in FIG. 1, the V2V network system may include a network device and a plurality of communications devices.

The network device may be a macro base station in a universal mobile telecommunications system (UMTS) or a long term evolution (LTE) wireless communications system, for example, an evolved NodeB (eNB); or may be a micro base station in a heterogeneous network (HetNet) scenario; or may be a baseband processing unit (BBU) and a remote radio unit (RRU) in a distributed base station scenario; or may be a baseband unit pool (BBU pool) and an RRU in a cloud access network (CRAN) scenario; or may be a gNB in a future 5G wireless communications system; or may be a station in a wireless local area network, for example, a Wi-Fi station in a wireless fidelity (WiFi) system.

In the V2V network system shown in FIG. 1, the communications device may be a device that has a vehicle-mounted communications module or another embedded communications module. In some other scenarios such as V2P, the communications device may alternatively be a handheld device of a user, such as a mobile phone or a tablet computer; or may be a vehicle-mounted communications module or another embedded communications module; or may be a UE-type-road side unit in the V2I scenario.

Each communications device in the plurality of communications devices may transmit a message such as control signaling to the network device through an uplink and a downlink, so that the network device schedules the communications device. The message between the communications device and the network device may be transmitted by using a Uu air interface. Each communications device may be used as a source device, at least one another communications device of the plurality of communications devices is used as a destination device, and data transmission to the destination device is initiated on a sidelink. When the destination device includes only one communications device, the source device may perform unicast transmission with the destination device on the sidelink; and when the destination device includes two or more communications devices, the source device may perform multicast transmission with the destination device on the sidelink. Data transmission between communications devices may be performed on the sidelink (SL).

The source device and the destination device in the following embodiments of this application are respectively used to represent transmission identities of communications devices, and may be communications devices of a same type, or may be communications devices of different types. For example, in a scenario, a communications device A may be used as the source device, and a communications device B may be used as the destination device. In another scenario, the communications device B may be used as the source device, and the communications device A may be used as the destination device.

It should be understood that the terms "include" and "have" are not exclusive. For example, a process, a method, a system, a product, or a device including a series of operations or units is not limited to the listed operations or units, and may further include operations or units that are not listed.

According to the embodiments of this application, unicast or multicast transmission between communications devices can be implemented, so that an information unreachable problem caused due to half-duplex on a sidelink can be resolved, and it is effectively ensured that information transmitted by a first communications device accurately reaches a second communications device. The unicast transmission between the communications devices may be, for example, applicable to information sharing between two vehicles in a group in an internet of vehicles scenario, or may be applicable to information transmission between a vehicle and a user in a ride sharing scenario, or may be applicable to information transmission between a vehicle and infrastructure in a V2I scenario. The multicast transmission between the communications devices may be, for example, applicable to information sharing between a plurality of vehicles in a group in a platooning scenario, a self-driving scenario, and the like.

The communication method provided in the embodiments of this application is described below as an example with reference to a plurality of embodiments.

Figure 2:
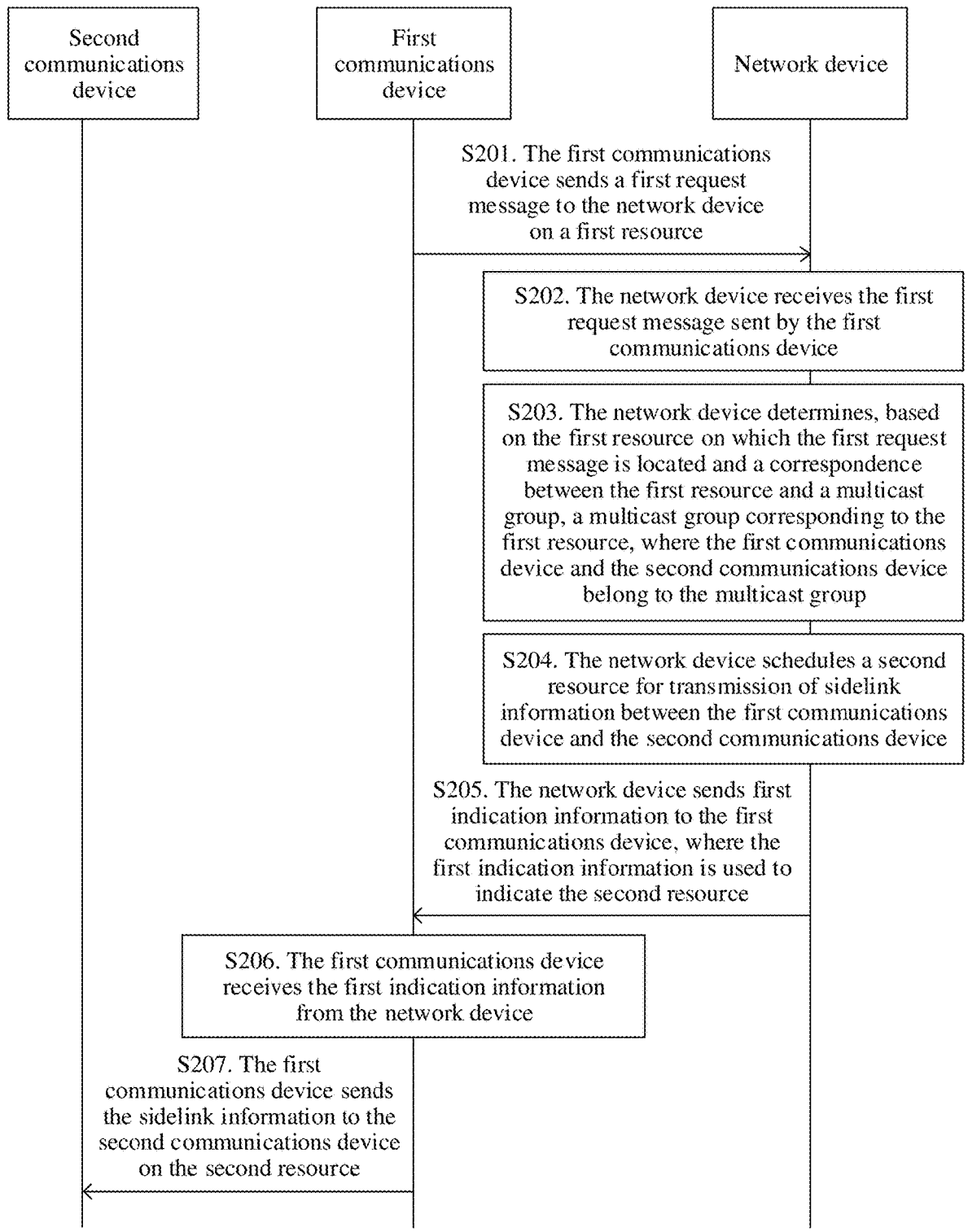
FIG. 2 is a flowchart of an information transmission method according to an embodiment of this application.

FIG. 2 is a flowchart of an information transmission method according to an embodiment of this application. The information transmission method may be interactively performed by a first communications device, a network device, and a second communications device. As shown in FIG. 2, the information transmission method may include the following operations.

S201. The first communications device sends a first request message to the network device on a first resource.

The first communications device may be referred to as a source communications device or a communications device at a transmit end, and the second communications device may be referred to as a destination communications device or a communications device at a receive end.

The first request message is used to request the network device to schedule a resource for transmission of sidelink information between the first communications device and the second communications device. The first communications device and the second communications device may belong to one multicast group, and the first resource may be a resource that is corresponding to the multicast group and that is used for sending a request message.

The first communications device may send the first request message to the network device on the first resource by using an uplink. The first request message may be used to request the network device to schedule the resource for transmission of the sidelink information between the first communications device and the second communications device, that is, schedule the first communications device to send the sidelink information on the resource, and schedule the second communications device to receive the sidelink information on the resource.

According to the information transmission method provided in this embodiment, the first communications device may implicitly indicate the second communications device to the network device in a process of sending the first request message to the network device. Because the first resource is a resource that is corresponding to a first multicast group and that is used for sending a request message, and both the first communications device and the second communications device belong to the multicast group, in this information transmission method, the multicast group may be implicitly indicated to the network device by using a resource on which the first request message is located, that is, the first resource, and the second communications device is further implicitly indicated.

The first resource may include at least one type of resource such as a time-frequency resource, a space resource, and a code sequence resource. Different multicast groups may correspond to different resources for sending the request message.

If the first request message is a scheduling request (SR) message, the first resource may also be referred to as an SR resource corresponding to the multicast group.

The sidelink information may be transmission information on the sidelink, for example, any one of sidelink control information, sidelink data information, or sidelink response information.

S202. The network device receives the first request message sent by the first communications device.

S203. The network device determines, based on a first resource on which the first request message is located and a correspondence between a first resource and a multicast group, a multicast group corresponding to the first resource, where the first communications device and the second communications device belong to the multicast group.

That is, when the multicast group is determined, the network device determines the second communications device. For example, another communications device other than the first communications device in the multicast group may be determined as the second communications device.

S204. The network device schedules a second resource for transmission of the sidelink information between the first communications device and the second communications device.

When the first communications device and the second communications device are determined, the network device may schedule the second resource for transmission of the sidelink information between the first communications device and the second communications device, that is, schedule the first communications device to send the sidelink information on the second resource, and schedule the second communications device to receive the sidelink information on the second resource, to avoid scheduling the second communications device to send the sidelink information.

The network device schedules the second resource for transmission of the sidelink information between the first communications device and the second communications device, that is, allocates the second resource for the first communications device to send the sidelink information to the second communications device.

S205. The network device sends first indication information to the first communications device, where the first indication information is used to indicate the second resource.

The first indication information may be carried in a scheduling grant (SG) control message.

In a process of sending the first indication information to the first communications device, the network device may further explicitly indicate or implicitly indicate, to the first communications device, the second communications device corresponding to current scheduling. If the explicit indication manner is used, the first indication information may include identification information of the second communications device; if the implicit indication manner is used, the first indication information may not include the identification information of the second communications device, and the second communications device is implicitly indicated in a manner of encrypting or scrambling the first indication information by using the identification information of the second communications device.

The network device may send the first indication information to the first communications device on a downlink.

S206. The first communications device receives the first indication information from the network device.

S207. The first communications device sends the sidelink information to the second communications device on the second resource.

The first communications device may send the sidelink information to the second communications device on the second resource by using the sidelink.

Because the network device schedules the first communications device to send the sidelink information and schedules the second communications device to receive the sidelink information, the network device does not need to schedule sending of the identification information of the second communications device, and reachability of the sidelink information sent by the first communications device to the second communications device can be effectively ensured.

According to the information transmission method provided in this embodiment of this application, the first communications device may send the first request message to the network device on the first resource, so that the network device schedules the resource for transmission of the sidelink information between the first communications device and the second communications device, the first communications device and the second communications device belong to one multicast group, and the first resource is a resource that is corresponding to the multicast group and that is used for sending the request message; and the network device further returns the first indication information to the first communications device, where the first indication information is used to indicate the second resource that is scheduled by the network device and that is used for transmission of the sidelink information between the first communications device and the second communications device, so that after receiving the first indication information, the first communications device may send the sidelink information to the second communications device on the second resource. In this method, the first communications device may send the first request message to the network device, so that the network device schedules the resource for transmission of the sidelink information between the first communications device and the second communications device, thereby avoiding scheduling the second communications device to send the information. This can effectively ensure reachability of the sidelink information sent by the first communications device to the second communications device, and effectively resolve an information unreachable problem caused due to half-duplex on a sidelink.

In addition, in the information transmission method, because the first resource is the resource that is corresponding to the multicast group to which the first communications device and the second communications device belong and that is used for sending the request message, the information transmission method may be applicable to a multicast transmission scenario between communications devices. In a process in which the first communications device requests scheduling from the network device by using the first request message, the first communications device implicitly indicates the second communications device to the network device by using the resource on which the first request message is located, that is, the first resource. This can further reduce an amount of information carried in the first request message, reduce changes of the request message, and improve applicability of the method while ensuring the reachability of the sidelink information sent by the first communications device to the second communications device.

In an embodiment, in the information transmission method described above, the first resource may be a preset resource.

In an embodiment, in the information transmission method described above, the first resource may be a resource configured by the network device. In this way, before the first communications device sends the first request message to the network device on the first resource in S201, the method may further include:

the network device sends second indication information to the first communications device, where the second indication information is used to indicate the first resource; and the first communications device receives the second indication information from the network device.

The first resource may include, for example, at least one type of resource such as the time-frequency resource, the space resource, and the code sequence resource.

For example, the network device may determine, based on the multicast group in which the first communications device is located and a correspondence between a preset multicast group and a resource, that a resource corresponding to the multicast group is the first resource, and send the second indication information to the first communications device, so that the network device configures the first resource.

Figure 3:
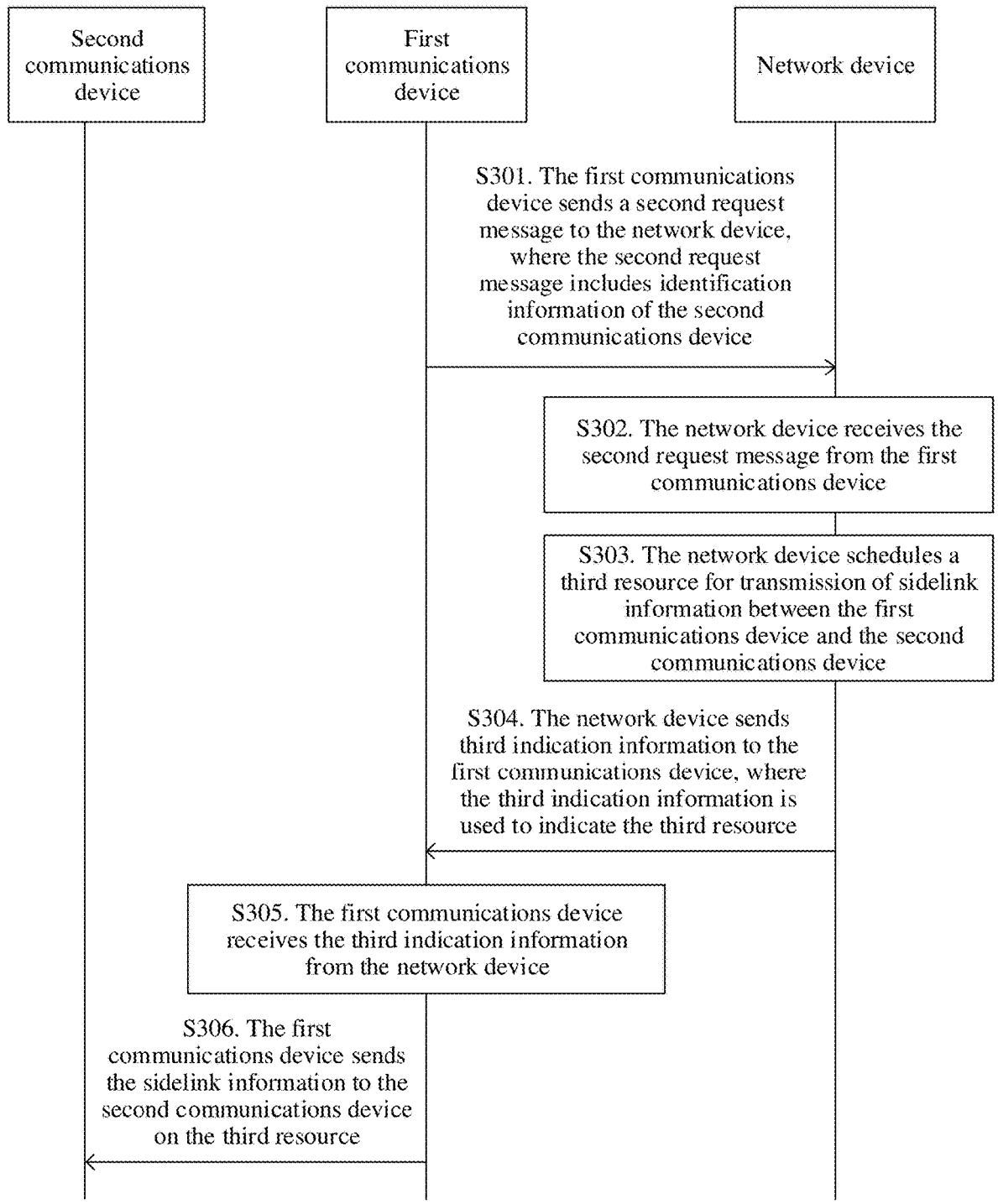
FIG. 3 is a flowchart of an information transmission method according to an embodiment of this application.

An embodiment of this application may further provide an information transmission method. FIG. 3 is a flowchart of an information transmission method according to an embodiment of this application. The information transmission method may be interactively performed by a first communications device, a network device, and a second communications device. As shown in FIG. 3, the information transmission method may include the following operations.

S301. The first communications device sends a second request message to the network device, where the second request message includes identification information of the second communications device.

The second request message is used to request the network device to schedule a resource for transmission of sidelink information between the first communications device and the second communications device. The sidelink information may be transmission information on a sidelink, for example, any one of sidelink control information, sidelink data information, or sidelink response information. The second request message may be, for example, a buffer status report (BSR) message.

The second request message may further be used to request the network device to schedule the resource for transmission of the sidelink information between the first communications device and the second communications device, that is, schedule the first communications device to send the sidelink information on the resource, and schedule the second communications device to receive the sidelink information on the resource.

According to the information transmission method provided in this embodiment, the first communications device may explicitly indicate, to the network device, the second communications device by using the identification information of the second communications device included in the second request message, in a process of sending the second request message to the network device.

S302. The network device receives the second request message from the first communications device.

S303. The network device schedules a third resource for transmission of the sidelink information between the first communications device and the second communications device.

When the second request message is received, the network device may determine the second communications device based on the identification information of the second communications device included in the second request message, and schedule the third resource for transmission of the sidelink information between the first communications device and the second communications device, that is, schedule the first communications device to send the sidelink information on the third resource, and schedule the second communications device to receive the sidelink information on the third resource, to avoid scheduling the second communications device to send the sidelink information.

The network device schedules the third resource for transmission of the sidelink information between the first communications device and the second communications device, that is, allocates the third resource for the first communications device to send the sidelink information to the second communications device.

S304. The network device sends third indication information to the first communications device, where the third indication information is used to indicate the third resource.

The third indication information may also be carried in an SG control message.

In a process of sending the third indication information to the first communications device, the network device may further explicitly indicate or implicitly indicate, to the first communications device, the second communications device corresponding to current scheduling. If the explicit indication manner is used, the third indication information may include identification information of the second communications device; if the implicit indication manner is used, the third indication information may not include the identification information of the second communications device, and the second communications device is implicitly indicated in a manner of encrypting or scrambling the first indication information by using the identification information of the second communications device.

S305. The first communications device receives the third indication information from the network device.

S306. The first communications device sends the sidelink information to the second communications device on the third resource.

The first communications device may send the sidelink information to the second communications device on the third resource by using the sidelink.

Because the network device schedules the first communications device to send the sidelink information and schedules the second communications device to receive the sidelink information, the network device does not need to schedule sending of the identification information of the second communications device, and reachability of the sidelink information sent by the first communications device to the second communications device can be effectively ensured.

According to the information transmission method provided in this embodiment of this application, the first communications device may send the second request message to the network device, so that the network device schedules the resource for transmission of the sidelink information between the first communications device and the second communications device, and the second request message includes the identification information of the second communications device; and the network device further returns the third indication information to the first communications device, where the third indication information is used to indicate the third resource that is scheduled by the network device and that is used for transmission of the sidelink information between the first communications device and the second communications device, so that after receiving the third indication information, the first communications device may send the sidelink information to the second communications device on the third resource. In this method, the first communications device may send the second request message to the network device, so that the network device schedules the resource for transmission of the sidelink information between the first communications device and the second communications device, thereby avoiding scheduling the second communications device to send the information. This can effectively ensure reachability of the sidelink information sent by the first communications device to the second communications device, and effectively resolve an information unreachable problem caused due to half-duplex on a sidelink.

In an embodiment, in the information transmission method shown in FIG. 3, the identification information of the second communications device may include at least one of the following information:

a logical channel group (LCG) identifier corresponding to a traffic flow of the first communications device, an LCG identifier corresponding to a traffic flow of a multicast group to which the first communications device belongs, a group identifier of a multicast group to which the second communications device belongs, an identifier of the second communications device, and a semi-persistent scheduling configuration index of the first communications device, a semi-persistent scheduling configuration index of a multicast group to which the first communications device belongs, or the like.

The group identifier may be a group radio network temporary identifier (G-RNTI) of the multicast group to which the second communications device belongs; the identifier of the second communications device may be, for example, a cell radio network temporary identifier (C-RNTI) of the second communications device.

The traffic flow of the first communications device is a traffic flow transmitted for the second communications device, the first communications device and the second communications device belong to a same multicast group, and the semi-persistent scheduling configuration index of the first communications device is a semi-persistent scheduling configuration index transmitted for the second communications device.

The following describes, by using an example, the identification information of the second communications device included in the BSR.

Figure 4:
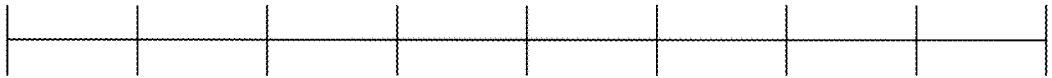
FIG. 4 is a schematic structural diagram in which a BSR message carries identification information of a second communications device in an information transmission method according to an embodiment of this application.

In a first example, FIG. 4 is a schematic structural diagram in which a BSR message carries identification information of a second communications device in an information transmission method according to an embodiment of this application. As shown in FIG. 4, for each second communications device, the BSR message may have a 4-bit destination index, a 2-bit LCG identifier, a 6-bit buffer size, and a 4-bit identifier of the second communications device. Certainly, the identifier of the second communications device may alternatively have another quantity of bits, and 4 bits are merely an example. A location relationship between the identifier of the second communications device and another field may not be limited to that shown in FIG. 4, and details are not described herein again.

The destination index may be corresponding to a layer-2 ID, and may be used to indicate a destination index for V2X sidelink communication (the destination for V2X sidelink communication) in a V2X internet of vehicles scenario. The layer-2 ID may be a layer-2 ID that is configured by a higher layer and that is used to identify a service.

The LCG identifier may be an LCG identifier corresponding to a service flow of the first communications device, or an LCG identifier corresponding to a service flow of a multicast group to which the first communications device belongs. For service flows of a same communications device or service flows of a same multicast group, different services may be corresponding to different logical channel identifiers (LCID), and the different LCIDs may have a same LCG identifier. That is, LCIDs corresponding to different services may be allocated to a same LCG.

The identifier of the second communications device may include a multicast group identifier of the second communications device and/or the identifier of the second communications device. The multicast group identifier of the second communications device may be a group identifier such as the G-RNTI of the multicast group to which the second communications device belongs, or may be a multicast group index of the multicast group to which the second communications device belongs. The multicast group index corresponds to the group identifier G-RNTI. The multicast group index may be identified by using less than 16 bits. For example, 16 multicast groups may be identified by using 4 bits. The identifier of the second communications device may be an identifier such as the C-RNTI of the second communications device, or may be a device index of the second communications device. The device index corresponds to the device identifier. The device index may be identified by using less than 16 bits. For example, 16 device indexes may be identified by using 4 bits. The multicast group index and/or the device index may be determined by the first communications device and sent to a network by using RRC signaling. In this embodiment, the multicast group index and/or the device index may be implicitly carried in an extended sidelink user equipment information (Sidelink UE Information) message, a related message body in the extended sidelink user equipment information message may be as follows: a sidelink vehicle-to-everything common transmit resource request (SL-V2X-CommTxResource Req-r16):

```
SL-V2X-CommTxResourceReq-r16 ::= SEQUENCE {
carrierFreqCommTx-r16      INTEGER (0.. maxFreqV2X-1-r16)
OPTIONAL,
  v2x-TypeTxSync-r16   SL-TypeTxSync-r16   OPTIONAL,
  v2x-DestinationInfoList-r16   SL-DestinationInfoList-r16
  OPTIONAL
  SL-v2x-GroupInfoList-r16 ::=
  SEQUENCE (SIZE (1..max-SL-v2x-group-r16)) OF
  SL-v2x-GroupInfo-r16 }
  SL-v2x-GroupInfo-r16 ::= SEQUENCE (SIZE
  (1..max-SL-v2x-GroupSize-r16)) OF
C-RNTI
```

In the solution in this embodiment, multicast groups are reported in a sequence of sidelink vehicle-to-everything group information list (SL-v2x-GroupInfoList-r16) fields in a message to implicitly indicate the multicast group index, each multicast group includes a group of communications device identifiers C-RNTIs, and the communications device index may be implicitly indicated by using sequentially arranged C-RNTIs.

The following Table 1 may be an example of a correspondence between the multicast group index and the second communications device index that are maintained by the network and the first communications device, and the multicast group and the second communications device.

TABLE 1

| Multicast group index/Second communications device index | Multicast group/Second communications device |
| --- | --- |
| 0000 | V2X-G-RNTI 0 |
| 0001 | C-RNTI 1 |
| ... | ... |
| 1111 | V2X-G-RNTI 15 |

Figure 5:
FIG. 5 is a schematic structural diagram in which a BSR message carries identification information of a second communications device in an information transmission method according to an embodiment of this application.

In a second example, FIG. 5 is a schematic structural diagram in which a BSR message carries identification information of a second communications device in an information transmission method according to an embodiment of this application. As shown in FIG. 5, for each second communications device, the BSR message may have a 4-bit destination index, a 2-bit LCG identifier, and a 6-bit buffer size.

In FIG. 5, a description of the LCG identifier may be similar to the description in FIG. 4. For details, refer to the foregoing description. Details are not described herein again.

Different from FIG. 4, in an example corresponding to FIG. 5, a destination index may further correspond to an identifier of each second communications device, and may include a multicast group identifier of the second communications device and/or the identifier of the second communications device. The multicast group identifier of the second communications device may be a group identifier such as the G-RNTI of the multicast group to which the second communications device belongs, or may be a multicast group index of the multicast group to which the second communications device belongs. The multicast group index corresponds to the group identifier G-RNTI. The identifier of the second communications device may be an identifier such as the C-RNTI of the second communications device, or may be a device index of the second communications device. The device index corresponds to the device identifier. The multicast group index/the device index may be identified by using less than 16 bits. For example, 16 multicast group indexes/device indexes may be identified by using 4 bits.

Figure 6:
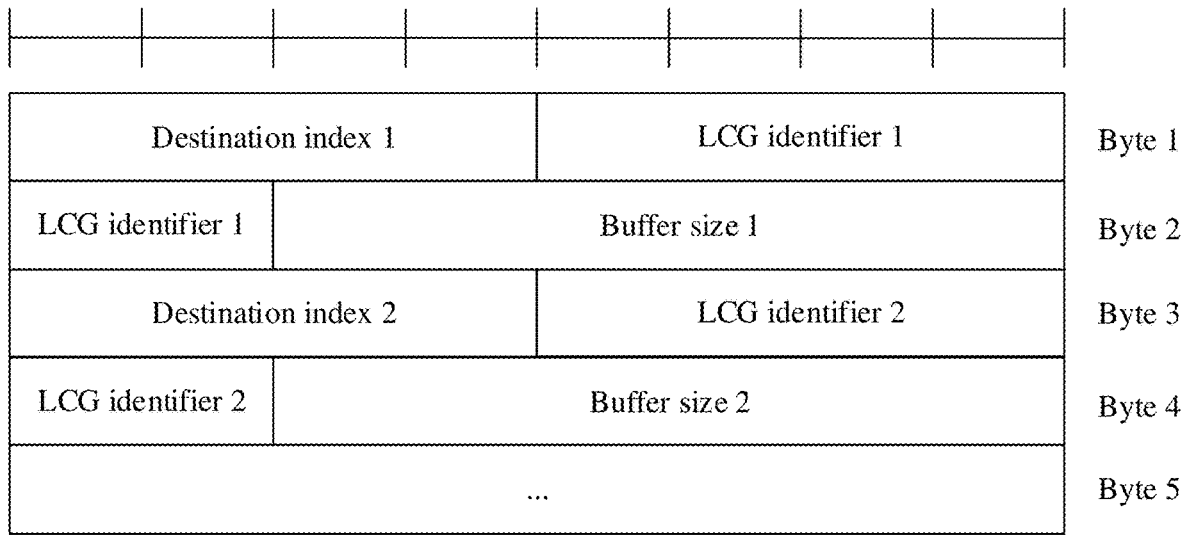
FIG. 6 is a schematic structural diagram in which a BSR message carries identification information of a second communications device in an information transmission method according to an embodiment of this application.

In a third example, FIG. 6 is a schematic structural diagram in which a BSR message carries identification information of a second communications device in an information transmission method according to an embodiment of this application. As shown in FIG. 6, for each second communications device, the BSR message may include a 4-bit destination index, a 6-bit LCG identifier, and a 6-bit buffer size.

A meaning of the destination index in FIG. 6, may be similar to that in FIG. 4. For details, refer to the foregoing description. Details are not described herein again.

In FIG. 6, a meaning of 2 bits in the LCG identifier may be similar to the meaning of the LCG identifier in FIG. 4. For details, refer to the foregoing description. Details are not described herein again. The remaining 4 bits in the LCG identifier in FIG. 6 may be used to indicate an LCG identifier of the second communications device, or may be used to indicate an LCG identifier of a multicast group to which the second communications device belongs. The LCG identifier may be an LCG identifier corresponding to a service flow of the first communications device, or an LCG identifier corresponding to a service flow of a multicast group to which the first communications device belongs. For the first communications device or all services in the multicast group to which the first communications device belongs, there is a same LCG identifier. The traffic flow of the first communications device is a traffic flow transmitted for the second communications device, and the first communications device and the second communications device belong to a same multicast group.

Both the network device and the first communications device need to maintain a correspondence between the logical channel group and the multicast group/the second communications device, to determine the second communications device based on the LCG identifier or determine the multicast group based on the LCG identifier and then determine the second communications device, or determine the LCG identifier based on the second communications device, or determine the LCG identifier based on the multicast group to which the second communications device belongs.

In an example corresponding to FIG. 6, a maximum of 16 LCG identifiers may be indicated by using four bits. Herein, four bits are not limited for indication, and are merely an example. Alternatively, another quantity of bits may be used for indication. For example, three bits may be used to indicate a maximum of eight LCG identifiers.

For example, the correspondence between the logical channel group and the multicast group/the second communications device may be shown in the following Table 2.

TABLE 2

| Logical channel group | Multicast group/Second communications device |
| --- | --- |
| 0000 | V2X-G-RNTI 0/C-RNTI 0 |
| 0001 | V2X-G-RNTI 1/C-RNTI 1 |
| ... | ... |
| 1111 | V2X-G-RNTI 15/C-RNTI 15 |

According to Table 2, it can be learned that if an identifier of a logical channel group is 0000, a corresponding multicast group is a multicast group corresponding to the V2X-G-RNTI 0, or a corresponding second communications device is a communications device corresponding to the C-RNTI 0; if an identifier of a logical channel group is 0001, a corresponding multicast group is a multicast group corresponding to the V2X-G-RNTI 1, or a corresponding second communications device is a communications device corresponding to the C-RNTI 1; or if an identifier of a logical channel group is 1111, a corresponding multicast group is a multicast group corresponding to the V2X-G-RNT 15, or a corresponding second communications device is a communications device corresponding to the C-RNTI 15.

Table 2 is merely an example of the correspondence between the logical channel group and the multicast group/ the second communications device. The correspondence between the logical channel group and the multicast group/ the second communications device may be shown in the following Table 3.

TABLE 3

| Logical channel group | Multicast group/Second communications device |
|---|---|
| 0000 | V2X-G-RNTI 0 |
| 0001 | C-RNTI 1 |
| ... | ... |
| 1111 | V2X-G-RNTI 15 |

According to Table 3, it can be learned that if the logical channel group identifier is 0000, a corresponding multicast group is a multicast group corresponding to the V2X-G-RNTI 0; or if the identifier of the logical channel group is 0001, a corresponding second communications device is a communications device corresponding to the C-RNTI 1; or if the identity of the logical channel group is 1111, a corresponding multicast group is a multicast group corresponding to V2X-G-RNT 15.

Figure 7:
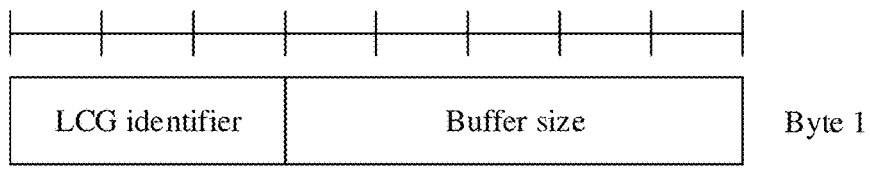
FIG. 7 is a schematic structural diagram in which a BSR message carries identification information of a second communications device in an information transmission method according to an embodiment of this application.

In a fourth example, FIG. 7 is a schematic structural diagram in which a BSR message carries identification information of a second communications device in an information transmission method according to an embodiment of this application. As shown in FIG. 7, the BSR message may include a 3-bit LCG identifier and a 5-bit buffer size. The LCG identifier may be an LCG identifier corresponding to a service flow of the first communications device, or an LCG identifier corresponding to a service flow of a multicast group to which the first communications device belongs. For the first communications device or all services in the multicast group to which the first communications device belongs, there is a same LCG identifier. The traffic flow of the first communications device is a traffic flow transmitted for the second communications device, and the first communications device and the second communications device belong to a same multicast group.

In the example in FIG. 7, the LCG identifier may be used to indicate the second communications device, or a multicast group to which the second communications device belongs.

Both a network device and the first communications device need to maintain a correspondence between a logical channel group and a multicast group/the second communications device, to determine the second communications device based on the LCG identifier, or determine the multicast group based on the LCG identifier and then determine the second communications device; or determine the LCG identifier based on the second communications device, or determine the LCG identifier based on the multicast group to which the second communications device belongs.

In an example corresponding to FIG. 7, a maximum of eight LCG identifiers may be indicated by using three bits. Herein, three bits are not limited for indication, and are merely an example. Alternatively, another quantity of bits may be used for indication. The correspondence between the logical channel group and the multicast group/the second communications device may be similar to that shown in Table 2 or Table 3. For details, refer to the foregoing description. Details are not described herein again.

Figure 8:
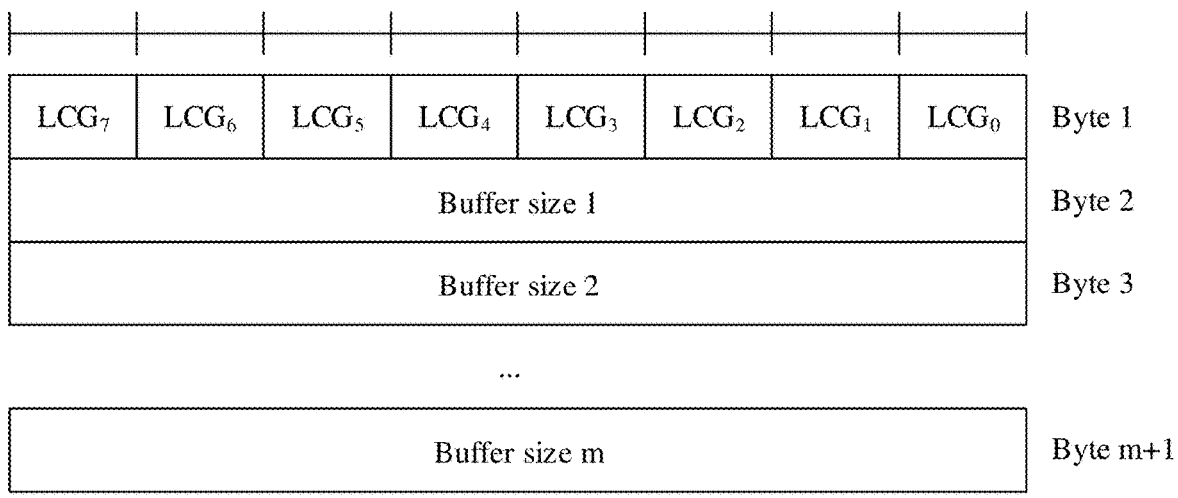
FIG. 8 is a schematic structural diagram in which a BSR message carries identification information of a second communications device in an information transmission method according to an embodiment of this application.

In a fifth example, FIG. 8 is a schematic structural diagram in which a BSR message carries identification information of a second communications device in an information transmission method according to an embodiment of this application. As shown in FIG. 8, the BSR message may include a 1-byte LCG identifier and an m-byte buffer size.

The 1-byte LCG identifier is a value of a bit in an LCG identifier corresponding to a service flow of the first communications device, or a value of a bit in an LCG identifier corresponding to a service flow of a multicast group to which the first communications device belongs. $LCG_0$ to $LCG_7$ constitute the LCG identifier corresponding to the service flow of the first communications device, or the LCG identifier corresponding to the service flow of the multicast group to which the first communications device belongs. The traffic flow of the first communications device is a traffic flow transmitted for the second communications device, and the first communications device and the second communications device belong to a same multicast group.

For all services of the first communications device or all services in the multicast group to which the first communications device belongs, there is a same LCG identifier.

Because the service flow of the first communications device is the service flow transmitted for the second communications device, the LCG identifier corresponding to the service flow of the first communications device may be used to indicate the second communications device. If the first communications device and the second communications device belong to the same multicast group, the LCG identifier corresponding to the service flow of the multicast group to which the first communications device belongs may indicate a multicast group in which the second communications device is located.

It should be noted that FIG. 7 or FIG. 8 shows merely some examples in which the LCG identifier indicates the second communications device. The LCG identifier in FIG. 7 and FIG. 8 may alternatively be replaced with an identifier of the second communications device, a device index of the second communications device, an identifier of a multicast group to which the second communications device belongs, a multicast group index of a multicast group to which the second communications device belongs, or a semi-persistent scheduling configuration index. In other words, in this application, the identifier of the second communications device, the device index of the second communications device, the identifier of the multicast group to which the second communications device belongs, the multicast group index of the multicast group to which the second communications device belongs, or the semi-persistent scheduling configuration index may be carried in the BSR. A corresponding structural diagram may be similar to that in FIG. 7 or FIG. 8. Details are not described herein again.

FIG. 4 to FIG. 8 are merely embodiments of the BSR. In an embodiment, the BSR message may further include other information, and a quantity of bits occupied by each part of information and front and back locations of the part of information may not be limited to those shown in FIG. 4 to FIG. 8.

In a first example, the BSR message may further include a semi-persistent scheduling configuration index of the first communications device, or a semi-persistent scheduling configuration index of the multicast group to which the first communications device belongs. The semi-persistent scheduling configuration index of the first communications device is a semi-persistent scheduling configuration index transmitted for the second communications device. The semi-persistent scheduling configuration index of the multicast group to which the first communications device belongs is a semi-persistent scheduling configuration index transmitted for the multicast group, and the first communications device and the second communications device belong to the same multicast group.

Different semi-persistent scheduling configuration indexes of the first communications device may correspond to different unicast scheduling requests transmitted for different second communications devices, and may also correspond to different unicast scheduling requests that are of different services and that are transmitted for a same communications device. Different semi-persistent scheduling configuration indexes of the multicast group to which the first communications device belongs may correspond to different multicast scheduling requests transmitted for different multicast groups, and may also correspond to different multicast scheduling requests that are of different services and that are transmitted for a same multicast group. Therefore, the network device may determine, based on the semi-persistent scheduling configuration index in the BSR message, the second communications device or the multicast group to which the second communications device belongs, to which the scheduling request is specific.

In a sixth example, FIG. 9 is a schematic structural diagram in which a BSR message carries identification information of a second communications device in an information transmission method according to an embodiment of this application. As shown in FIG. 9, for each second communications device, the BSR message may include a 4-bit destination index, a 2-bit LCG identifier, a 6-bit buffer size, and 4-bit semi-persistent scheduling configuration index.

In FIG. 9, meanings of the destination indexes and the LCG identifiers may be similar to those in FIG. 4. For details, refer to the foregoing description. Details are not described herein again.

The semi-persistent scheduling configuration index may be a semi-persistent scheduling configuration index of a first communications device, or a semi-persistent scheduling configuration index of a multicast group to which the first communications device belongs. The semi-persistent scheduling configuration index of the first communications device is a semi-persistent scheduling configuration index transmitted for the second communications device. The semi-persistent scheduling configuration index of the multicast group to which the first communications device belongs is a semi-persistent scheduling configuration index transmitted for the multicast group, and the first communications device and the second communications device belong to the same multicast group.

Both a network device and the first communications device need to maintain a correspondence between the semi-persistent scheduling configuration index and the multicast group/second communications device, to determine the second communications device based on the semi-persistent scheduling configuration index, or determine the multicast group based on the semi-persistent scheduling configuration index and then determine the second communications device, or determine the semi-persistent scheduling configuration index based on the second communications device, or determine the semi-persistent scheduling configuration index based on the multicast group to which the second communications device belongs.

The correspondence between the semi-persistent scheduling configuration index and the multicast group/second communications device may be shown in the following Table 4.

TABLE 4

| Semi-persistent scheduling configuration index | Multicast group/Second communications device |
| --- | --- |
| 0000 | V2X-G-RNTI 0 |
| 0001 | C-RNTI 1 |
| ... | ... |
| 1111 | V2X-G-RNTI 15 |

According to Table 4, it can be learned that if the semi-persistent scheduling configuration index is 0000, a corresponding multicast group is a multicast group corresponding to the V2X-G-RNTI 0; if the semi-persistent scheduling configuration index is 0001, a corresponding second communications device is a communications device corresponding to the C-RNTI 1; or if the semi-persistent scheduling configuration index is 1111, a corresponding multicast group is a multicast group corresponding to the V2X-G-RNT 15.

Table 4 is merely an example of the correspondence between the semi-persistent scheduling configuration index and the multicast group/second communications device. The correspondence between the semi-persistent scheduling configuration index and the multicast group/second communications device may alternatively be another example. Details are not described herein.

Based on any one of the foregoing information transmission methods, in an embodiment, in the information transmission method, the network device may explicitly indicate, to the first communications device, the second communications device for which this scheduling is performed. For example, the network device may add a preset field to downlink control information (DCI) sent to the first communications device to carry identification information of the second communications device, or add identification information of the second communications device to a reusable field in the DCI.

In an embodiment, in the information transmission method, the network device may further implicitly indicate, to the first communications device, the second communications device for which this scheduling is performed. For example, the network device may sequentially perform scrambling on to-be-sent DCI by using the identification information of the second communications device and identification information of the first communications device. After receiving the message, the first communications device may reversely sequentially perform descrambling by using the identification information of the first communications device and the identification information of the second communications device, to obtain corresponding DCI. If the descrambling succeeds, the first communications device may determine the second communications device, and then implicitly indicate the second communications device.

Figure 10:
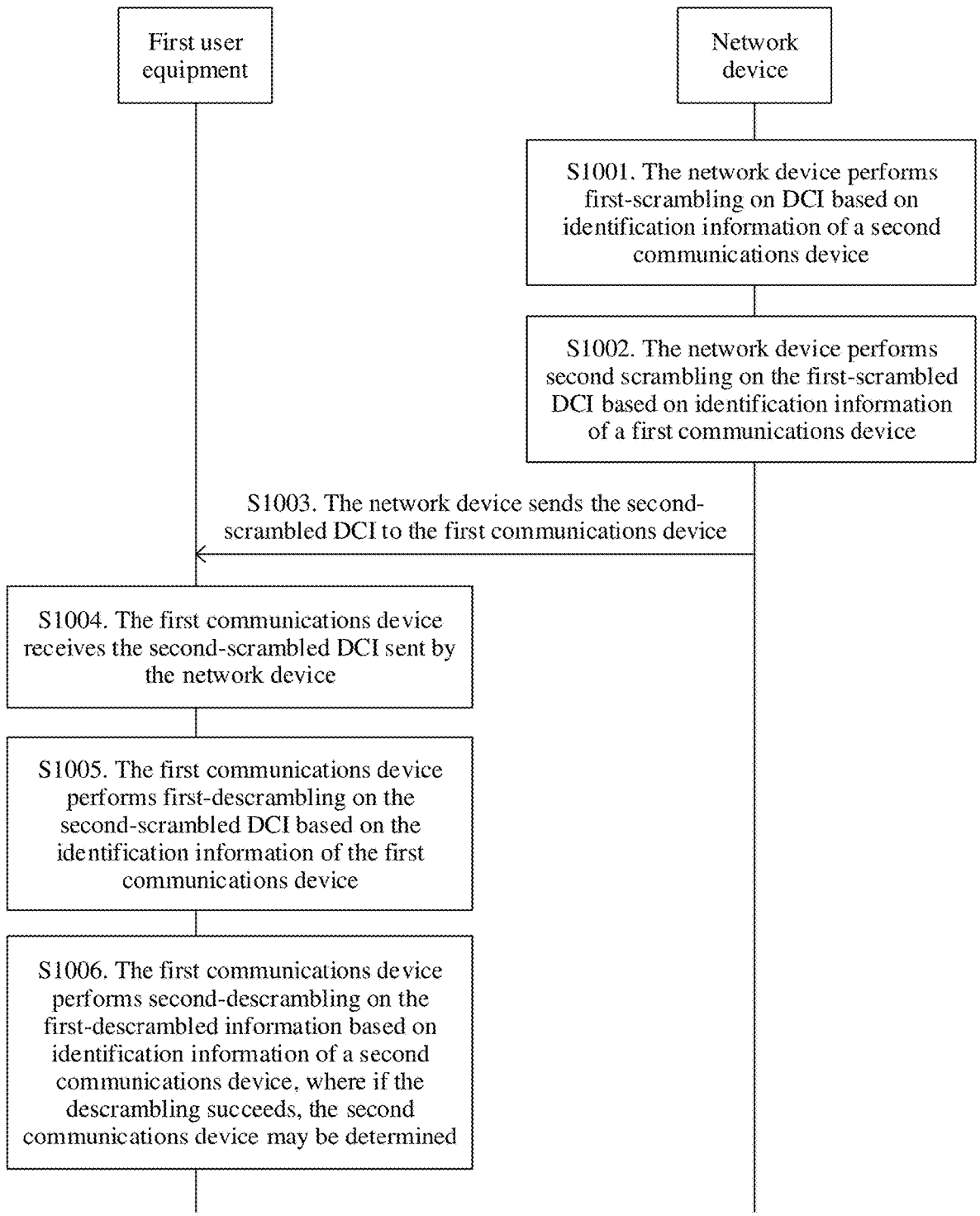
FIG. 10 is a flowchart of an information transmission method according to an embodiment of this application.

FIG. 10 is a flowchart of an information transmission method according to an embodiment of this application. The method shown in FIG. 10 may be performed based on the method shown in FIG. 2 or FIG. 3. As shown in FIG. 10, the method may include the following operations.

S1001. A network device performs first-scrambling on DCI based on identification information of a second communications device.

Identification information of the second communications device may be similar to identification information of the second communications device that is included in the BSR message. Details are not described herein again.

S1002. The network device performs second-scrambling on the first-scrambled DCI based on identification information of the first communications device.

The identification information of the first communications device may include a C-RNTI of the first communications device. Certainly, the identification information of the first communications device may be other information, and details are not described herein.

S1003. The network device sends the second-scrambled DCI to the first communications device.

In the information transmission method in this embodiment, the network device may perform second-scrambling on the DCI based on the identification information of the second communications device and the identification information of the first communications device. This ensures accurate transmission of the DCI, and implements implicit indication of the identification information of the second communications device.

S1004. The first communications device receives the second-scrambled DCI sent by the network device.

S1005. The first communications device performs first-descrambling on the second-scrambled DCI based on the identification information of the first communications device.

S1006. The first communications device performs second-descrambling on the first-descrambled information based on the identification information of the second communications device, where if the descrambling succeeds, the second communications device may be determined.

In the information transmission method in this embodiment, the first communications device may perform second-descrambling on DCI from the network device based on the identification information of the first communications device and the identification information of the second communications device. If the descrambling succeeds, the second communications device may be determined.

The information transmission method described above may be applicable to a dynamic scheduling transmission scenario, and may be further applicable to a semi-persistent scheduling scenario. If the method is applicable to a semi-persistent scheduling transmission scenario, dynamic scheduling transmission may be first performed for a period of time. After the dynamic scheduling transmission lasts for a period of time, the network device may trigger and activate the semi-persistent transmission scenario of the service.

In a dynamic scheduling transmission process performed before the semi-persistent transmission, for example, the first communications device may add a semi-persistent scheduling configuration index to the second request message, for example, a BSR message, and send the second request message to the network device, to indicate unicast of the requested scheduling for the second communications device or multicast of a multicast group to which the second communications device belongs. Alternatively, the network device may add a semi-persistent scheduling configuration index to DCI and return the DCI to the first communications device, to indicate unicast of the second communications device or multicast of a multicast group to which the second communications device belongs.

The network device may configure semi-persistent scheduling transmission by sending radio resource control (RRC) to the first communications device. In other words, the network device may send an RRC message to the first communications device, and the RRC message may include information such as the semi-persistent scheduling configuration index. The semi-persistent scheduling configuration index may be a semi-persistent scheduling configuration index of the first communications device, or a semi-persistent scheduling configuration index of a multicast group to which the first communications device belongs. The semi-persistent scheduling configuration index of the first communications device is a semi-persistent scheduling configuration index transmitted for the second communications device. The semi-persistent scheduling configuration index of the multicast group to which the first communications device belongs is a semi-persistent scheduling configuration index transmitted for a multicast group to which the second communication belongs. The first communications device and the second communications device belong to a same multicast group.

The network device and the first communications device separately maintain a correspondence between a semi-persistent scheduling index and a communications device or a multicast group. The network device may determine the semi-persistent scheduling index based on the second communications device or the multicast group to which the second communications device belongs and the correspondence, add the semi-persistent scheduling index to the RRC, and send the RRC to the first communications device. After receiving the RRC message, the first communications device may determine, based on the semi-persistent scheduling index included in the RRC message and the correspondence, the second communications device or the multicast group to which the second communications device belongs, and then trigger the semi-persistent scheduling transmission.

Figure 11:
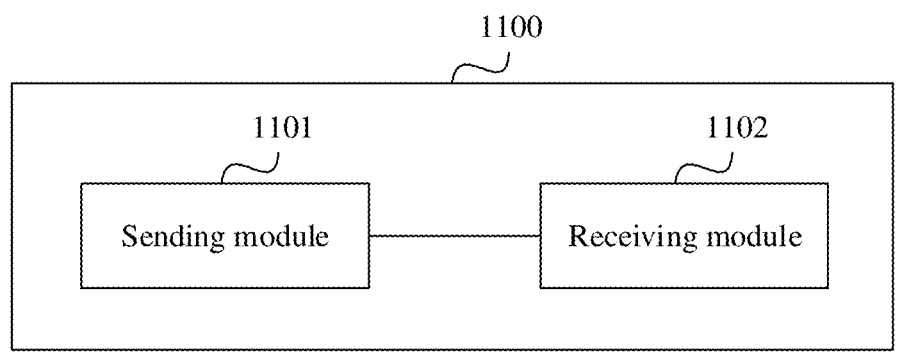
FIG. 11 is a schematic structural diagram of a communications device according to an embodiment of this application.

An embodiment of this application may further provide a communications device. The communications device may be a first communications device, and the first communications device may perform the information transmission method performed by the first communications device in FIG. 2 or FIG. 10. FIG. 11 is a schematic structural diagram of a communications device according to an embodiment of this application. The apparatus 1100 shown in FIG. 11 may be a first communications device, and may include the following modules.

A sending module 1101 is configured to send a first request message to a network device on a first resource, where the first request message is used to request the network device to schedule a resource for transmission of sidelink information between the first communications device and a second communications device, the first communications device and the second communications device belong to one multicast group, and the first resource is a resource that is corresponding to the multicast group and that is used for sending a request message.

A receiving module 1102 is configured to receive first indication information sent by the network device, where the first indication information is used to indicate a second resource scheduled by the network device for transmission of the sidelink information between the first communications device and the second communications device.

The sending module 1101 is further configured to send the sidelink information to the second communications device on the second resource.

In an implementable manner, the first resource is a preset resource; or the receiving module 1102 is further configured to receive second indication information sent by the network device, where the second indication information is used to indicate the first resource.

In another implementable manner, the first request message is an SR message.

In still another implementable manner, the first indication information includes identification information of the second communications device.

In yet another implementable manner, the receiving module 1102 is further configured to receive scrambled DCI sent by the network device.

The apparatus 1100 may further include:

a processing module, configured to: perform first-descrambling on the scrambled DCI based on identification information of the first communications device, and perform second-descrambling on the first-descrambled information based on the identification information of the second communications device, to obtain the identification information of the second communications device.

The communications device provided in this embodiment of this application may perform the information transmission method performed by the first communications device in FIG. 2 or FIG. 10. For a specific embodiment and beneficial effects thereof, refer to the foregoing descriptions. Details are not described herein again.

Figure 12:
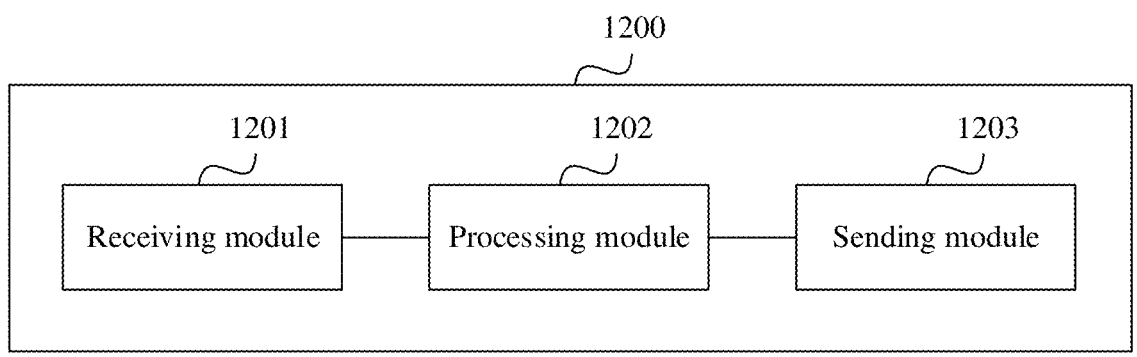
FIG. 12 is a schematic structural diagram of a network device according to an embodiment of this application.

An embodiment of this application may further provide a network device. The network device may perform the information transmission method performed by the network device in FIG. 2 or FIG. 10. FIG. 12 is a schematic structural diagram of a network device according to an embodiment of this application. The apparatus 1200 shown in FIG. 12 may be a network device, and may include the following modules.

A receiving module 1201 is configured to receive a first request message sent by a first communications device, where the first request message is used to request a resource scheduled by the network device for transmission of sidelink information between the first communications device and a second communications device.

A processing module 1202 is configured to: determine, based on a first resource on which the first request message is located and a correspondence between a preset resource and a multicast group, a multicast group corresponding to the first resource, where the first communications device and the second communications device belong to the multicast group; and schedule a second resource for transmission of the sidelink information between the first communications device and the second communications device.

A sending module 1203 is configured to send first indication information to the first communications device, where the first indication information is used to indicate the second resource.

In an embodiment, the first resource is the preset resource; or the sending module 1203 is further configured to send second indication information to the first communications device, where the second indication information is used to indicate the first resource.

In another implementable manner, the first request message is an SR message.

In still another implementable manner, the first indication information includes identification information of the second communications device.

In yet another implementable manner, the processing module 1202 is further configured to: perform first-scrambling on DCI based on the identification information of the second communications device; and perform second-scrambling on the first-scrambled DCI based on identification information of the first communications device.

The sending module 1203 is further configured to send the second-scrambled DCI to the first communications device.

The network device provided in this embodiment of this application may perform the information transmission method performed by the network device in FIG. 2 or FIG. 10. For a specific embodiment and beneficial effects thereof, refer to the foregoing descriptions. Details are not described herein again.

Figure 13:
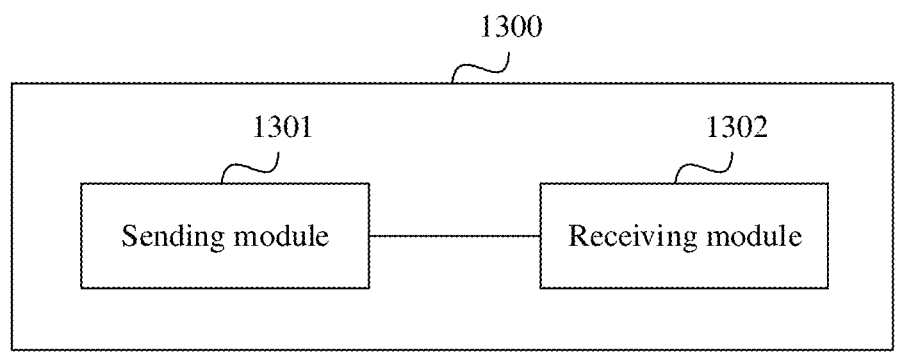
FIG. 13 is a schematic structural diagram of another communications device according to an embodiment of this application.

An embodiment of this application may further provide a communications device. The communications device may be a first communications device, and the first communications device may perform the information transmission method performed by the first communications device in FIG. 3 or FIG. 10. FIG. 13 is a schematic structural diagram of another communications device according to an embodiment of this application. The apparatus 1300 shown in FIG. 13 may be a first communications device, and may include the following modules.

A sending module 1301 is configured to send a second request message to a network device, where the second request message is used to request the network device to schedule a resource for transmission of sidelink information between the first communications device and a second communications device, and the second request message includes identification information of the second communications device.

A receiving module 1302 is configured to receive third indication information sent by the network device, where the third indication information is used to indicate a third resource scheduled by the network device for transmission of the sidelink information between the first communications device and the second communications device.

The sending module 1301 is further configured to send the sidelink information to the second communications device on the third resource.

In an implementable manner, the second request message is a BSR message.

In another implementable manner, the identification information of the second communications device includes at least one of the following information:

an LCG identifier corresponding to a traffic flow of the first communications device, an LCG identifier corresponding to a traffic flow of a multicast group to which the first communications device belongs, a group identifier of a multicast group to which the second communications device belongs, an identifier of the second communications device, and a semi-persistent scheduling configuration index of the first communications device or a semi-persistent scheduling configuration index of a multicast group to which the first communications device belongs; and the traffic flow of the first communications device is a traffic flow transmitted for the second communications device, the first communications device and the second communications device belong to a same multicast group, and the semi-persistent scheduling configuration index of the first communications device is a semi-persistent scheduling configuration index transmitted for the second communications device.

In still another implementable manner, the third indication information includes the identification information of the second communications device.

In yet another implementable manner, the receiving module 1302 is further configured to receive scrambled DCI sent by the network device.

The apparatus 1300 further includes:

a processing module, configured to: perform first-descrambling on the scrambled DCI based on identification information of the first communications device, and perform second-descrambling on the first-descrambled information based on the identification information of the second communications device, to determine the identification information of the second communications device.

The communications device provided in this embodiment of this application may perform the information transmission method performed by the first communications device in either of FIG. 3 and FIG. 10. For a specific embodiment and beneficial effects thereof, refer to the foregoing descriptions. Details are not described herein again.

Figure 14:
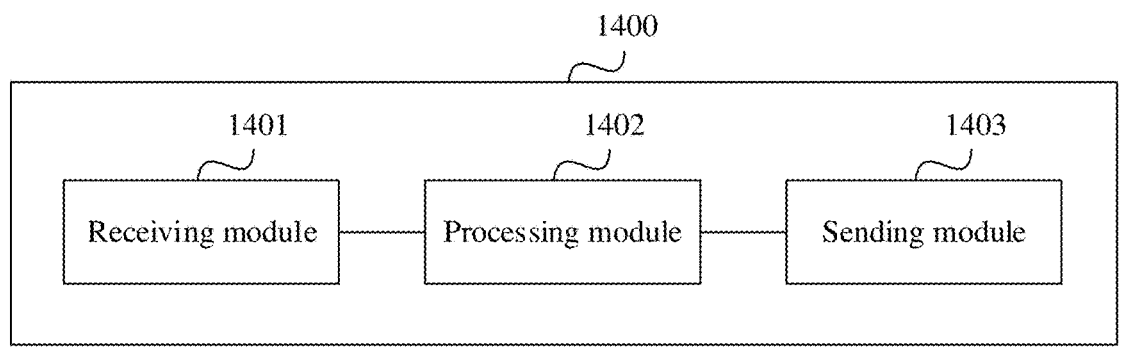
FIG. 14 is a schematic structural diagram of another network device according to an embodiment of this application.

An embodiment of this application may further provide a network device. The network device may perform the information transmission method performed by the network device in FIG. 3 or FIG. 10. FIG. 14 is a schematic structural diagram of another network device according to an embodiment of this application. The apparatus 1400 shown in FIG. 14 may be a network device, and may include the following modules.

A receiving module 1401 is configured to receive a second request message sent by a first communications device, where the second request message includes identification information of a second communications device.

A processing module 1402 is configured to schedule a third resource for transmission of sidelink information between the first communications device and the second communications device.

A sending module 1403 is configured to send third indication information to the first communications device, where the third indication information is used to indicate the third resource.

In an implementable manner, the second request message is a BSR message.

In another implementable manner, the identification information of the second communications device includes at least one of the following information:

an LCG identifier corresponding to a traffic flow of the first communications device, an LCG identifier corresponding to a traffic flow of a multicast group to which the first communications device belongs, a group identifier of a multicast group to which the second communications device belongs, an identifier of the second communications device, and a semi-persistent scheduling configuration index of the first communications device or a semi-persistent scheduling configuration index of a multicast group to which the first communications device belongs; and the traffic flow of the first communications device is a traffic flow transmitted for the second communications device, the first communications device and the second communications device are located in a same multicast group, and the semi-persistent scheduling configuration index of the first communications device is a semi-persistent scheduling configuration index transmitted for the second communications device.

In still another implementable manner, the third indication information includes the identification information of the second communications device.

In yet another implementable manner, the processing module 1402 is further configured to: perform first-scrambling on DCI based on the identification information of the second communications device; and perform second-scrambling on the first-scrambled DCI based on identification information of the first communications device.

The sending module 1403 is further configured to send the second-scrambled DCI to the first communications device.

The network device provided in this embodiment of this application may perform the information transmission method performed by the network device in FIG. 3 or FIG. 10. For a specific embodiment and beneficial effects thereof, refer to the foregoing descriptions. Details are not described herein again.

Figure 15:
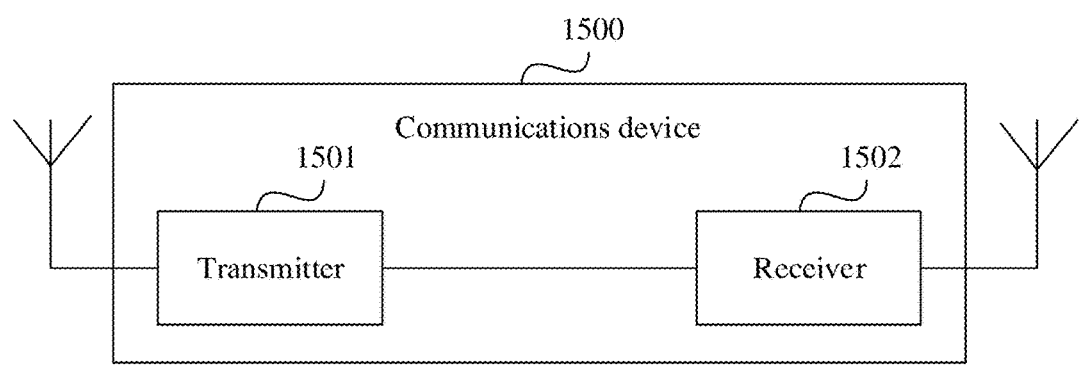
FIG. 15 is a schematic structural diagram of a communications device according to an embodiment of this application.

An embodiment of this application may further provide a communications device. The communications device may be a first communications device, and the first communications device may perform the information transmission method performed by the first communications device in FIG. 2 or FIG. 10. FIG. 15 is a schematic structural diagram of a communications device according to an embodiment of this application. The communications device 1500 shown in FIG. 15 may include a transmitter 1501 and a receiver 1502.

The transmitter 1501 is configured to send a first request message to a network device on a first resource, where the first request message is used to request the network device to schedule a resource for transmission of sidelink information between the first communications device and a second communications device, the first communications device and the second communications device belong to one multicast group, and the first resource is a resource that is corresponding to the multicast group and that is used for sending a request message.

The receiver 1502 is configured to receive first indication information sent by the network device, where the first indication information is used to indicate a second resource scheduled by the network device for transmission of the sidelink information between the first communications device and the second communications device.

The transmitter 1501 is further configured to send the sidelink information to the second communications device on the second resource.

It should be understood that the communications device has any function of the first communications device in the method in FIG. 2 or FIG. 10. For any function, refer to the method in FIG. 2 or FIG. 10. Details are not described herein again.

In an embodiment, an embodiment of this application may further provide a computer program product, where the computer program product includes program code for performing the information transmission method performed by the first communications device in either of FIG. 2 and FIG. 10.

When the computer program product runs on a computer, the computer may be enabled to perform the information transmission method performed by the first communications device in FIG. 2 or FIG. 10.

In an embodiment, an embodiment of this application may further provide a computer-readable storage medium, where the storage medium is configured to store a computer program product, and the computer program product includes program code. The program code may include program code for performing the information transmission method performed by the first communications device in FIG. 2 or FIG. 10.

When the computer program product runs on a computer, the computer may be enabled to perform the information transmission method performed by the first communications device in FIG. 2 or FIG. 10.

The computer-readable storage medium may be an internal memory in the communications device 1500 shown in FIG. 15, or may be an external memory connected to the communications device 1500 shown in FIG. 15. For example, the program code in the computer program product may be executed by the processor in the communications device 1500 shown in FIG. 15.

In an example, the apparatus 1100 shown in FIG. 11 may alternatively be a chip, the sending module 1201 may be specifically an output port (or an output circuit) of the chip, and the receiving module 1102 is specifically an input port (or an input circuit) of the chip.

In an embodiment, the output port of the chip may be configured to send a first request message to a network device on a first resource, where the first request message is used to request the network device to schedule a resource for transmission of sidelink information between the first communications device and a second communications device, the first communications device and the second communications device belong to one multicast group, and the first resource is a resource that is corresponding to the multicast group and that is used for sending a request message.

The input port of the chip may be configured to receive first indication information sent by the network device, where the first indication information is used to indicate a second resource scheduled by the network device for transmission of the sidelink information between the first communications device and the second communications device.

The output port of the chip may be further configured to send the sidelink information to the second communications device on the second resource.

In an embodiment, the output port of the chip may be further configured to perform another function corresponding to the sending module 1101 in the foregoing embodiment, but an output of the output port may be a signal in a form of a baseband signal, or a signal output to another component or circuit inside a same device. The input port of the chip may be further configured to perform another function corresponding to the receiving module 1102 in the foregoing embodiment, but an input of the input port may be a signal in a form of a baseband signal, or a signal from another component or circuit inside a same device.

The communications device, the computer program product, the computer-readable storage medium and the chip provided in this embodiment of this application may perform the information transmission method performed by the first communications device in FIG. 2 or FIG. 10. For a specific embodiment and beneficial effects thereof, refer to the foregoing descriptions. Details are not described herein again.

Figure 16:
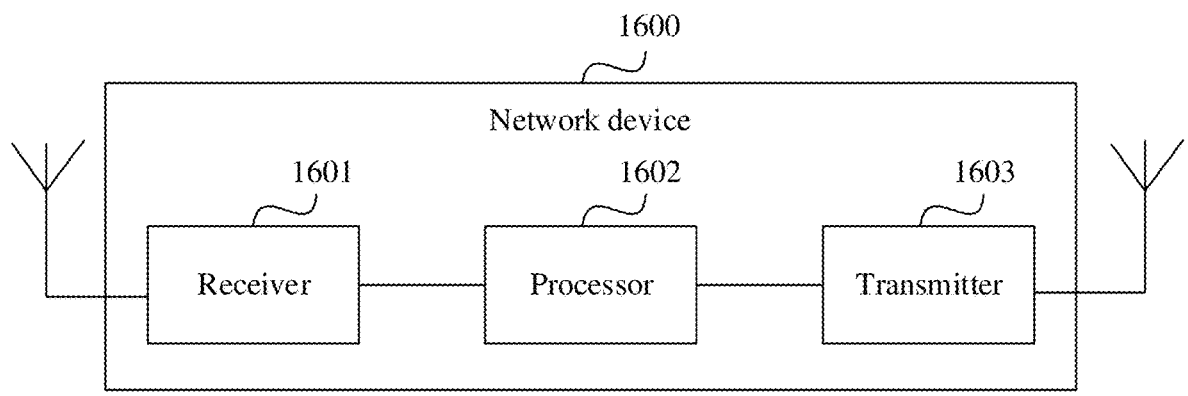
FIG. 16 is a schematic structural diagram of a network device according to an embodiment of this application.

An embodiment of this application may further provide a network device. The network device may perform the information transmission method performed by the network device in FIG. 2 or FIG. 10. FIG. 16 is a schematic structural diagram of a network device according to an embodiment of this application. The network device 1600 shown in FIG. 16 may include a receiver 1601, a processor 1602, and a transmitter 1603. The receiver 1601 and the transmitter 1603 are separately coupled to the processor 1602.

The receiver 1601 is configured to receive a first request message sent by a first communications device, where the first request message is used to request a resource scheduled by the network device for transmission of sidelink information between the first communications device and a second communications device.

A processor 1602 is configured to: determine, based on a first resource on which the first request message is located and a correspondence between a preset resource and a multicast group, a multicast group corresponding to the first resource, where the first communications device and the second communications device belong to the multicast group; and schedule a second resource for transmission of the sidelink information between the first communications device and the second communications device.

A transmitter 1603 is configured to send first indication information to the first communications device, where the first indication information is used to indicate the second resource.

It should be understood that the communications device has any function of the network device in the method in FIG. 2 or FIG. 10. For any function, refer to the method in FIG. 2 or FIG. 10. Details are not described herein again.

In an embodiment, an embodiment of this application may further provide a computer program product, where the computer program product includes program code for performing the information transmission method performed by the network device in either of FIG. 2 and FIG. 10.

When the computer program product runs on a computer, the computer may be enabled to perform the information transmission method performed by the network device in FIG. 2 or FIG. 10.

In an embodiment, an embodiment of this application may further provide a computer-readable storage medium, where the storage medium is configured to store a computer program product, and the computer program product includes program code. The program code may include program code for performing the information transmission method performed by the network device in FIG. 2 or FIG. 10.

When the computer program product runs on a computer, the computer may be enabled to perform the information transmission method performed by the network device in FIG. 2 or FIG. 10.

The computer-readable storage medium may be an internal memory in the network device 1600 shown in FIG. 16, or may be an external memory connected to the network device 1600 shown in FIG. 16. For example, the program code in the computer program product may be executed by the processor in the network device 1600 shown in FIG. 16.

In an example, the apparatus 1200 shown in FIG. 12 may alternatively be a chip. The processing module 1202 is specifically a processing kernel (or a processor) of the chip. The receiving module 1201 is specifically an input port (or an input circuit) of the chip. The sending module 1203 may be specifically an output port (or an output circuit) of the chip.

In an embodiment, the input port of the chip may be configured to receive a first request message sent by a first communications device, where the first request message is used to request a resource scheduled by the network device for transmission of sidelink information between the first communications device and a second communications device.

The processing kernel of the chip may be configured to: determine, based on a first resource on which the first request message is located and a correspondence between a preset resource and a multicast group, a multicast group corresponding to the first resource, where the first communications device and the second communications device belong to the multicast group; and schedule a second resource for transmission of the sidelink information between the first communications device and the second communications device.

The output port of the chip may be configured to send first indication information to the first communications device, where the first indication information is used to indicate the second resource.

In an embodiment, the input port of the chip may be further configured to perform another function corresponding to the receiving module 1201 in the foregoing embodiment, but an input of the input port may be a signal in a form of a baseband signal, or a signal from another component or circuit inside a same device. The processing kernel of the chip may be further configured to perform another function of the processing module 1202. The output port of the chip may be further configured to perform another function corresponding to the sending module 1203 in the foregoing embodiment, but an output of the output port may be a signal in a form of a baseband signal, or a signal output to another component or circuit inside a same device.

The network device, the computer program product, the computer-readable storage medium and the chip provided in this embodiment of this application may perform the information transmission method performed by the network device in FIG. 2 or FIG. 10. For a specific embodiment process and beneficial effects thereof, refer to the foregoing descriptions. Details are not described herein again.

Figure 17:
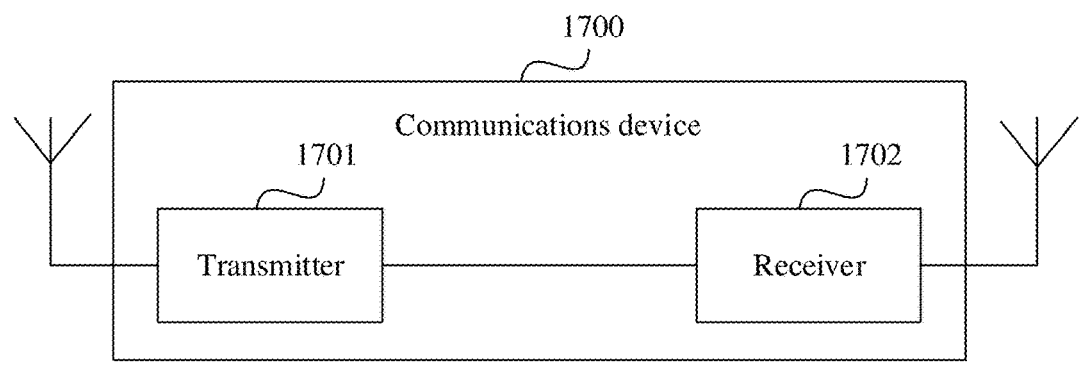
FIG. 17 is a schematic structural diagram of another communications device according to an embodiment of this application.

An embodiment of this application may further provide a communications device. The communications device may be a first communications device, and the first communications device may perform the information transmission method performed by the first communications device in FIG. 3 or FIG. 10. FIG. 17 is a schematic structural diagram of another communications device according to an embodiment of this application. The communications device 1700 shown in FIG. 17 may include a transmitter 1701 and a receiver 1702.

The transmitter 1701 is configured to send a second request message to a network device, where the second request message is used to request the network device to schedule a resource for transmission of sidelink information between the first communications device and a second communications device, and the second request message includes identification information of the second communications device.

The receiver 1702 is configured to receive third indication information sent by the network device, where the third indication information is used to indicate a third resource scheduled by the network device for transmission of the sidelink information between the first communications device and the second communications device.

The transmitter 1701 is further configured to send the sidelink information to the second communications device on the third resource.

It should be understood that the communications device has any function of the first communications device in the method in FIG. 3 or FIG. 10. For any function, refer to the method in FIG. 3 or FIG. 10. Details are not described herein again.

An embodiment of this application may further provide a computer program product, where the computer program product includes program code for performing the information transmission method performed by the first communications device in FIG. 3 or FIG. 10.

When the computer program product runs on a computer, the computer may be enabled to perform the information transmission method performed by the first communications device in FIG. 3 or FIG. 10.

An embodiment of this application may further provide a computer-readable storage medium, where the storage medium is configured to store a computer program product, and the computer program product includes program code. The program code may include program code for performing the information transmission method performed by the first communications device in FIG. 3 or FIG. 10.

When the computer program product runs on a computer, the computer may be enabled to perform the information transmission method performed by the first communications device in FIG. 3 or FIG. 10.

The computer-readable storage medium may be an internal memory in the communications device 1700 shown in FIG. 17, or may be an external memory connected to the communications device 1700 shown in FIG. 17. For example, the program code in the computer program product may be executed by the processor in the communications device 1700 shown in FIG. 17.

In an example, the apparatus 1300 shown in FIG. 13 may alternatively be a chip, the sending module 1301 may be specifically an output port (or an output circuit) of the chip, and the receiving module 1302 is specifically an input port (or an input circuit) of the chip.

In an embodiment, the output port of the chip may be configured to send a second request message to a network device, where the second request message is used to request the network device to schedule a resource for transmission of sidelink information between the first communications device and a second communications device, and the second request message includes identification information of the second communications device.

The input port of the chip may be configured to receive third indication information sent by the network device, where the third indication information is used to indicate a third resource scheduled by the network device for transmission of the sidelink information between the first communications device and the second communications device.

The output port of the chip is further configured to send the sidelink information to the second communications device on the third resource.

In an embodiment, the output port of the chip may be further configured to perform another function corresponding to the sending module 1301 in the foregoing embodiment, but an output of the output port may be a signal in a form of a baseband signal, or a signal output to another component or circuit inside a same device. The input port of the chip may be further configured to perform another function corresponding to the receiving module 1302 in the foregoing embodiment, but an input of the input port may be a signal in a form of a baseband signal, or a signal from another component or circuit inside a same device.

The communications device, the computer program product, the computer-readable storage medium and the chip provided in this embodiment of this application may perform the information transmission method performed by the first communications device in FIG. 3 or FIG. 10. For a specific embodiment and beneficial effects thereof, refer to the foregoing descriptions. Details are not described herein again.

Figure 18:
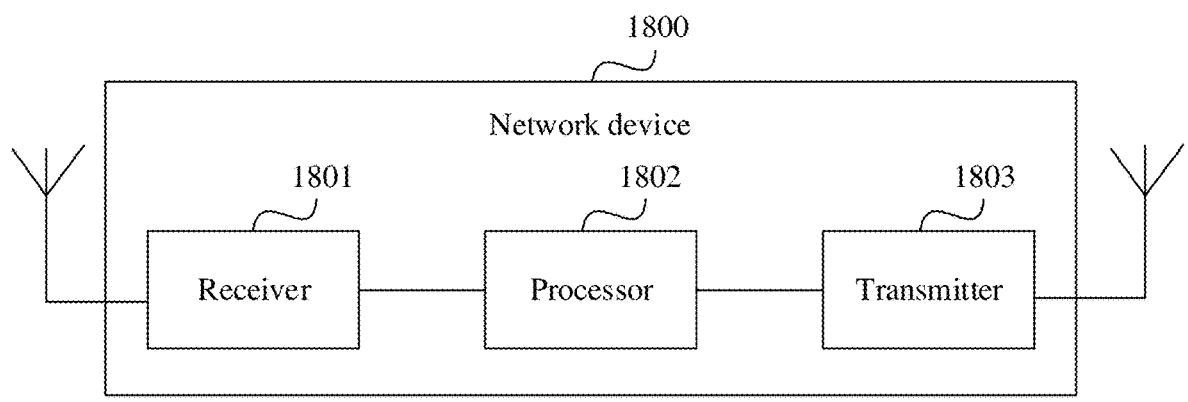
FIG. 18 is a schematic structural diagram of another network device according to an embodiment of this application.

An embodiment of this application may further provide a network device. The network device may perform the information transmission method performed by the network device in FIG. 3 or FIG. 10. FIG. 18 is a schematic structural diagram of another network device according to an embodiment of this application. The network device 1800 shown in FIG. 18 may include a receiver 1801, a processor 1802, and a transmitter 1803. The receiver 1801 and the transmitter 1803 are separately coupled to the processor 1802.

The receiver 1801 is configured to receive a second request message sent by a first communications device, where the second request message includes identification information of a second communications device.

The processor 1802 is configured to schedule a third resource for transmission of the sidelink information between the first communications device and the second communications device.

The transmitter 1803 is configured to send third indication information to the first communications device, where the third indication information is used to indicate the third resource.

It should be understood that the communications device has any function of the network device in the method in FIG. 3 or FIG. 10. For any function, refer to the method in FIG. 3 or FIG. 10. Details are not described herein again.

In an embodiment, an embodiment of this application may further provide a computer program product, where the computer program product includes program code for performing the information transmission method performed by the network device in either of FIG. 3 and FIG. 10.

When the computer program product runs on a computer, the computer may be enabled to perform the information transmission method performed by the network device in FIG. 3 or FIG. 10.

In an embodiment, an embodiment of this application may further provide a computer-readable storage medium, where the storage medium is configured to store a computer program product, and the computer program product includes program code. The program code may include program code for performing the information transmission method performed by the network device in FIG. 3 or FIG. 10.

When the computer program product runs on a computer, the computer may be enabled to perform the information transmission method performed by the network device in FIG. 3 or FIG. 11.

The computer-readable storage medium may be an internal memory in the network device 1800 shown in FIG. 18, or may be an external memory connected to the network device 1800 shown in FIG. 18. For example, the program code in the computer program product may be executed by the processor in the network device 1800 shown in FIG. 18.

In an example, the apparatus 1400 shown in FIG. 14 may alternatively be a chip. The processing module 1402 is specifically a processing kernel (or a processor) of the chip. The receiving module 1401 is specifically an input port (or an input circuit) of the chip. The sending module 1403 may be specifically an output port (or an output circuit) of the chip.

In an embodiment, the input port of the chip may be configured to receive a second request message sent by a first communications device, where the second request message includes the identification information of a second communications device.

The processing kernel may be configured to schedule a third resource for transmission of the sidelink information between the first communications device and the second communications device.

The output port of the chip may be further configured to send third indication information to the first communications device, where the third indication information is used to indicate the third resource.

In an embodiment, the input port of the chip may be further configured to perform another function corresponding to the receiving module 1401 in the foregoing embodiment, but an input of the input port may be a signal in a form of a baseband signal, or a signal from another component or circuit inside a same device. The processing kernel of the chip may be further configured to perform another function of the processing module 1402. The output port of the chip may be further configured to perform another function corresponding to the sending module 1403 in the foregoing embodiment, but an output of the output port may be a signal in a form of a baseband signal, or a signal output to another component or circuit inside a same device.

The network device, the computer program product, the computer-readable storage medium and the chip provided in this embodiment of this application may perform the information transmission method performed by the network device in FIG. 3 or FIG. 10. For a specific embodiment and beneficial effects thereof, refer to the foregoing descriptions. Details are not described herein again.

It should be noted that all or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or other programmable apparatuses. The computer instructions are stored in a computer-readable storage medium, or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), and the like.

What is claimed is:

1. An information transmission method, comprising:
    sending, by a first communications device, a first request message to a network device on a first resource, wherein the first request message is used to request the network device to schedule a resource for transmission of sidelink information between the first communications device and a second communications device that belong to one multicast group, and the first resource corresponds to the multicast group and is used for sending the first request message;
    receiving, by the first communications device, first indication information from the network device, wherein the first indication information is used to indicate a second resource scheduled by the network device for transmission of the sidelink information between the first communications device and the second communications device,
    wherein the first indication information includes scheduling the first communications device to send the sidelink information on the second resource, and scheduling the second communications device to receive the sidelink information on the second resource, to avoid scheduling the second communications device to send the sidelink information; and sending, by the first communications device the sidelink information to the second communications device on the second resource.

2. The method according to claim 1, wherein the first resource is a preset resource; or before the sending the first request message to the network device on the first resource, the method further comprises:

receiving, by the first communications device, second indication information sent by the network device, wherein the second indication information is used to indicate the first resource.

3. The method according to claim 1, wherein the first request message is a scheduling request (SR) message.

4. The method according to claim 1, wherein the first indication information comprises identification information of the second communications device; or the method further comprises:

receiving, by the first communications device, scrambled downlink control information (DCI) from the network device;

performing, by the first communications device, first-descrambling on the scrambled DCI based on identification information of the first communications device; and performing, by the first communications device, second-descrambling on the first-descrambled information based on the identification information of the second communications device, to determine the identification information of the second communications device.

5. An information transmission method, comprising:

sending, by a first communications device, a second request message to a network device to request the network device to schedule a resource for transmission of sidelink information between the first communications device and a second communications device, and the second request message comprises identification information of the second communications device;

receiving, by the first communications device, third indication information from the network device, wherein the third indication information is used to indicate a third resource scheduled by the network device for transmission of the sidelink information between the first communications device and the second communications device, wherein the third indication information includes scheduling the first communications device to send the sidelink information on the third resource, and scheduling the second communications device to receive the sidelink information on the third resource, to avoid scheduling the second communications device to send the sidelink information; and sending, by the first communications device, the sidelink information to the second communications device on the third resource.

6. The method according to claim 5, wherein the second request message is a buffer status report (BSR) message.

7. The method according to claim 5, wherein the identification information of the second communications device comprises at least one of the following information:

a logical channel group (LCG) identifier corresponding to a traffic flow of the first communications device, an LCG identifier corresponding to a traffic flow of a multicast group to which the first communications device belongs, a group identifier of a multicast group to which the second communications device belongs, an identifier of the second communications device, or a semi-persistent scheduling configuration index of the first communications device or a semi-persistent scheduling configuration index of a multicast group to which the first communications device belongs; and the traffic flow of the first communications device is transmitted for the second communications device, the first communications device and the second communications device belong to a same multicast group, and the semi-persistent scheduling configuration index of the first communications device is a semi-persistent scheduling configuration index transmitted for the second communications device.

8. The method according to claim 5, wherein the third indication information comprises the identification information of the second communications device; or the method further comprises:

receiving, by the first communications device, scrambled downlink control information (DCI) from the network device;

performing, by the first communications device, first-descrambling on the scrambled DCI based on identification information of the first communications device; and performing, by the first communications device, second-descrambling on the first-descrambled information based on the identification information of the second communications device, to determine the identification information of the second communications device.

9. A communications device operating as a first communications device, comprising:

a transmitter, configured to send a first request message to a network device on a first resource to request the network device to schedule a resource for transmission of sidelink information between the first communications device and a second communications device that belong to one multicast group, and the first resource corresponds to the multicast group and is used for sending the first request message;

a receiver, configured to receive first indication information from the network device, wherein the first indication information is used to indicate a second resource scheduled by the network device for transmission of the sidelink information between the first communications device and the second communications device, wherein the first indication information includes scheduling the first communications device to send the sidelink information on the second resource, and scheduling the second communications device to receive the sidelink information on the second resource, to avoid scheduling the second communications device to send the sidelink information; and the transmitter is further configured to send the sidelink information to the second communications device on the second resource.

10. The communications device according to claim 9, wherein the first resource is a preset resource; or the receiver is further configured to receive second indication information sent by the network device, wherein the second indication information is used to indicate the first resource.

11. The communications device according to claim 9, wherein the first request message is a scheduling request (SR) message.

12. The communications device according to claim 9, wherein the first indication information comprises identification information of the second communications device; or the receiver is further configured to receive scrambled downlink control information (DCI) sent by the network device; and the communications device further comprises:

a processor, configured to: perform first-descrambling on the scrambled DCI based on identification information of the first communications device, and perform second-descrambling on the first-descrambled information based on the identification information of the second communications device, to determine the identification information of the second communications device.

13. A network device, comprising:

a receiver, configured to receive a second request message from a first communications device, wherein the second request message comprises identification information of a second communications device;

a processor, configured to schedule a third resource for transmission of sidelink information between the first communications device and the second communications device, wherein third indication information includes scheduling the first communications device to send the sidelink information on the third resource, and scheduling the second communications device to receive the sidelink information on the third resource, to avoid scheduling the second communications device to send the sidelink information; and a transmitter, configured to send the third indication information to the first communications device to indicate the third resource.

14. The network device according to claim 13, wherein the second request message is a buffer status report (BSR) message.

15. The network device according to claim 13, wherein the identification information of the second communications device comprises at least one of the following information:

a logical channel group (LCG) identifier corresponding to a traffic flow of the first communications device, an LCG identifier corresponding to a traffic flow of a multicast group to which the first communications device belongs, a group identifier of a multicast group to which the second communications device belongs, an identifier of the second communications device, or a semi-persistent scheduling configuration index of the first communications device or a semi-persistent scheduling configuration index of a multicast group to which the first communications device belongs; and the traffic flow of the first communications device is a traffic flow transmitted for the second communications device, the first communications device and the second communications device are located in a same multicast group, and the semi-persistent scheduling configuration index of the first communications device is a semi-persistent scheduling configuration index transmitted for the second communications device.

16. The network device according to claim 13, wherein the third indication information comprises the identification information of the second communications device; or the processor is configured to: perform first-scrambling on downlink control information (DCI) based on the identification information of the second communications device, and perform second-scrambling on the first-scrambled DCI based on identification information of the first communications device; and the transmitter is further configured to send the second-scrambled DCI to the first communications device.

* * * * *